(12) United States Patent
Matsui et al.

(10) Patent No.: US 9,783,708 B2
(45) Date of Patent: Oct. 10, 2017

(54) CONDUCTIVE PASTE

(71) Applicant: BANDO CHEMICAL INDUSTRIES, LTD., Kobe-Shi, Hyogo (JP)

(72) Inventors: Miki Matsui, Kobe (JP); Takuya Tomura, Kobe (JP); Tomofumi Watanabe, Kobe (JP); Kenji Shimoyama, Kobe (JP)

(73) Assignee: BANDO CHEMICAL INDUSTRIES, LTD., Kobe-shi, Kyogo (JP)

( * ) Notice: Subject to any disclaimer, the term of this patent is extended or adjusted under 35 U.S.C. 154(b) by 48 days.

(21) Appl. No.: 14/423,040

(22) PCT Filed: Aug. 5, 2013

(86) PCT No.: PCT/JP2013/004726
§ 371 (c)(1),
(2) Date: Feb. 20, 2015

(87) PCT Pub. No.: WO2014/030310
PCT Pub. Date: Feb. 27, 2014

(65) Prior Publication Data
US 2015/0232709 A1 Aug. 20, 2015

(30) Foreign Application Priority Data

Aug. 23, 2012 (JP) .................................. 2012-184565

(51) Int. Cl.
| | | |
|---|---|---|
| *H01B 1/20* | (2006.01) | |
| *H01B 1/22* | (2006.01) | |
| *C09D 5/24* | (2006.01) | |
| *C09J 9/02* | (2006.01) | |
| *H01B 1/00* | (2006.01) | |

(52) U.S. Cl.
CPC .................. *C09J 9/02* (2013.01); *H01B 1/20* (2013.01); *H01B 1/22* (2013.01); *C09D 5/24* (2013.01); *H01B 1/00* (2013.01)

(58) Field of Classification Search
CPC ............... H01B 1/20; H01B 1/22; C09D 5/24
USPC ....................................... 252/512–514, 518.1
See application file for complete search history.

(56) References Cited

U.S. PATENT DOCUMENTS 7,981,327 B2 * 7/2011 Sakaguchi ................ B22F 9/24
252/518.1
2011/0059233 A1 3/2011 Liu et al.

FOREIGN PATENT DOCUMENTS

| JP | 2003-217350 A | | 7/2003 |
|---|---|---|---|
| JP | 2006-252976 A | | 9/2006 |
| JP | 2006252976 A | * | 9/2006 |
| JP | 2009-097074 A | | 5/2009 |
| JP | 2010-202943 A | | 9/2010 |
| JP | 2011-058092 A | | 3/2011 |
| JP | 2011-094223 A | | 5/2011 |

OTHER PUBLICATIONS

Machine translation of JP 2006252976, 2015.*
International Search Report dated Sep. 17, 2013, issued in corresponding application No. PCT/JP2013/004726.

* cited by examiner

*Primary Examiner* — Khanh Tuan Nguyen
*Assistant Examiner* — Haidung Nguyen
(74) *Attorney, Agent, or Firm* — Westerman, Hattori, Daniels & Adrian, LLP

(57) ABSTRACT

An conductive paste comprises inorganic particles having alkylamine with 6 or less of carbon number on at least a portion of a surface, a polymer dispersant having a pigment affinity group in a main chain and/or a plurality of side chains, and, that comprising a polymer with a comb structure having a plurality of side chains constituting a solvation portion, a polymer having a plurality of pigment affinity portions made from a pigment affinity group in the main chain or a straight-chain polymer having a pigment affinity portion made from a pigment affinity group in one terminal of the main chain, a dispersion medium, wherein a weight reduction percentage at the time of heating solid content of the conductive paste from room temperature to 500° C. by thermal analysis is 15% by weight or less.

12 Claims, No Drawings

CONDUCTIVE PASTE

TECHNICAL FIELD

The present invention relates to an conductive paste containing metallic particles, and to be more specific, it relates to an conductive paste that has superior dispersing stability, and, that is preferably usable for bonding of metallic parts at a comparatively low temperature.

BACKGROUND TECHNOLOGY

Conventionally, it has been known that metallic nano particles (or metallic colloidal particles) with a great specific surface area and high reaction activity have a property to be fused at a low temperature (low-temperature sintering) compared to bulk and metallic atoms, and an application to various fields, for example, as an conductive paste is expected by utilizing this property.

For example, in Patent Literature 1 (Japanese Patent Application Laid-Open No. 2009-097074), Patent Literature 2 (Japanese Patent Application Laid-Open No. 2011-058092) and Patent Literature 3 (Japanese Patent Application Laid-Open No. 2010-202943), a metallic nano particle paste forming a minute wiring pattern on a substrate is proposed.

In Patent Literature 1 above, a metallic nano paste that is coated with a protective colloid composed of amines and carboxylic acid with 4 or greater of carbon number is disclosed, and although it is considered that it is possible to form a pattern at a low temperature and to sinter the paste at a low temperature, at 150° C. or less, but there is still room to improve the dispersing stability of the metallic nano particle paste.

Further, in Patent Literature 2 above, a process where a metallic compound is reacted with a reductant in a substantially solvent-free reacting mixture containing the metallic compound, the reductant and a stabilizer, such as organic amine, in the presence of the stabilizer, and a plurality of metal-containing nano particles having a molecule of the stabilizer on the surface due to a solvent-free reduction process is disclosed, and it is considered that the obtained metallic nano particle has a long storage life (stability) and a low annealing temperature, but an evaluation method for stability is only according to visual examination, and there is still room to improve the dispersing stability.

In addition, in Patent Literature 3 above, an aggregate of metallic colloid particles containing metallic nano particles and a dispersant is disclosed, and the dispersant is composed of a coagulation aid having at least one type of functional group selected from a group constituting a group having a nitrogen atom, a hydroxyl group and a carboxyl group; and a polymer dispersant, and its purpose is to collect and agglutinate particles, but the dispersing stability is not considered.

Further, the metallic nano particles (or metallic colloidal particles) as mentioned above are expected to be utilized for a use application to bonding of metallic parts due to their low-temperature sinterability. Since the sintered metallic nano particles (or metallic colloidal particles) indicate a similar characteristic to the same type of bulk materials, a junction part having very high heat resistance, reliability and heat dissipation can be obtained.

For example, in Patent Literature 4 (Japanese Patent Application Laid-Open No. 2011-094223), a bonding material for inorganic materials composed of metallic nano particles, a dispersant and a solvent is disclosed, and an inorganic material can be solidly joined under bonding conditions at a low temperature and at low pressure by controlling the particle size of the metallic nano particle to be 50 nm or less and 100 nm to 200 nm. However, in order to obtain metallic nano particles having wider particle size, a use of a coagulation aid is required, and compatibility between dispersing stability and high strength has not been accomplished.

Further, in Patent Literature 5 (Japanese Patent Application Laid-Open No. 2006-252976), a metallic nano paste that is obtained by adding an organic solvent with 185° C. to 250° C. of boiling point into a solid sol, which is obtained from a metallic nano particle solution with 93% by weight or greater of metallic concentration in solid content is disclosed. However, the objective is to prepare a metallic nano paste that is preferably usable for formation of an conductive pattern using screen printing by optimizing the metallic concentration, a solvent additive amount and viscosity, and the metallic nano paste is not considered as a composition for metal bonding at all.

PRIOR ART LITERATURE

Patent Literature

Patent Literature 1: Japanese Patent Application Laid Open No. 2009-097074
Patent Literature 2: Japanese Patent Application Laid Open No. 2011-058092
Patent Literature 3: Japanese Patent Application Laid Open No. 2010-202943
Patent Literature 4: Japanese Patent Application Laid Open No. 2011-094223
Patent Literature 5: Japanese Patent Application Laid Open No. 2006-252976

SUMMARY OF INVENTION

Problem to be Solved by the Invention

In light of the situation above, the first objective of the present invention is to provide an conductive paste that has low-temperature sinterability, and, has long-term dispersing stability. In addition, the second objective of the present invention is to provide an conductive paste that has superior dispersing stability, and is preferably usable for bonding of metallic parts at a comparatively low temperature.

Means for Solving the Problem

The inventor of the present invention has discovered that it is extremely effective to optimize an organic substance(s), a polymer dispersant, a dispersion medium and the like that are attached on the surfaces of the metallic particles, as a result of keen study about the composition of the conductive paste, a weight reduction rate upon heating and the like, in order to accomplish the objectives, and has accomplished the present invention.

In other words, the present invention provides the conductive paste, containing: inorganic particles having alkylamine with 6 or less of carbon number on at least a portion of a surface;
a polymer dispersant that has a pigment affinity group in a main chain and/or a plurality of side chains, and, that contains a polymer with a comb structure having a plurality of side chains constituting a solvation portion, a polymer having a plurality of pigment affinity portions made from a pigment affinity group in the main chain or a straight-chain polymer having a pigment affinity portion made from a pigment affinity group in one terminal of the main chain; and a dispersion medium, wherein a weight reduction percentage at the time of heating solid content of the conductive paste from room temperature to 500° C. by thermal analysis is 15% by weight or less.

The conductive paste of the present invention having the configuration above enables sintering at a low temperature, i.e., excels in low-temperature sinterability because of containing amine with low molecular weight, and it excels in dispersibility because of containing a polymer dispersant, and long-term dispersing stability can be secured. Further, a combination of a component that contributes to the low-temperature sinterability (mainly, alkylamine with 6 or less of carbon number) and a component that contributes to the dispersing stability (mainly a polymer dispersant) results in adsorption of both the components on the surfaces of the metallic particles to express characteristics, respectively. Furthermore, since the dispersing stability can be secured by containing the polymer dispersant as mentioned above, it becomes possible to optionally dilute [the conductive paste] (reducibility), thus it is possible to add various physical property-preparing agents for general-purpose printability.

Herein, the thermal analysis in the present invention is to perform thermogravimetric analysis upon the solid content of the conductive paste of the present invention (i.e., inorganic particles where alkylamine and the polymer dispersant are attached), for example, at 10° C./min of a rate of temperature increase, to obtain a weight reduction ratio. If the solid content is heated to 500° C., organic substances are oxidative-degraded, and a majority will be gasified and dissolved. Consequently, reduction in weight due to heating up to 500° C. will be substantially equivalent to an amount of the organic substances in the solid content. Furthermore, "room temperature" in the present invention is, for example, temperature at approximately 15° C. to 30° C.

Furthermore, since the polymer dispersant has a grafted structure where a pigment affinity group exists in a side chain, and that has a side chain constituting a solvation portion (polymer with a comb structure (1) below); and has a pigment affinity group (polymer (copolymer) (2) below and a straight-chain polymer (3) above) in a main chain, dispersibility of the colloidal particles composed of inorganic particles is excellent, and this is preferable as a protective colloid to the inorganic particles. A use of the polymer dispersant enables obtainment of an conductive paste composed of inorganic particle dispersing elements that contain high concentration of inorganic particles.

Furthermore, in the case of actually applying and baking using the conductive paste of the present invention, even if the temperature is not increased to temperature to be a standard in the thermal analysis regulated in the present invention (200° C. or 500° C.), organic substances may be decreased, but a decrease behavior of the organic substances upon application and baking in association associated with a temperature increase can be analyzed in detail by the thermal analysis, and this enables to clearly regulate characteristics upon heating (applying and baking) the conductive paste of the present invention.

For the conductive paste of the present invention, since its weight reduction ratio at the time of heating to 500° C. is small at 15% by weight or less, an amount of organic substances that evaporate on the occasion when the temperature becomes high due to the heating and fusion of inorganic particles becomes active is small, and it is difficult for integrity of connection of the fused inorganic particle to be impaired and sufficient low-temperature sinterability is obtained; therefore, an conductive property and thermal conductivity are also improved.

In addition, in the conductive paste of the present invention, an amino group(s) in one amine molecule has comparatively high polarity, and it easily causes interaction due to hydrogen bonding, but a portion other than these functional groups has comparatively low polarity. In addition, the amino group easily indicates an alkaline-like property, respectively. Therefore, when amine is localized (attached) to at least a portion of the surfaces of the inorganic particles in the conductive paste of the present invention (in other words, when at least a portion of the surfaces of the inorganic particles is covered), organic substances and the inorganic particles can cause sufficient affinity, and agglomeration of the inorganic particles is prevented.

Even in the case of adding a dispersion medium as needed, because the organic substances act as a dispersant, a dispersing state of the inorganic particles in the dispersion medium is remarkably improved. In other words, according to the conductive paste of the present invention, since a specific combination of organic substances is contained, it is difficult for the inorganic particles to be agglutinated and it excels in dispersing stability, and dispersibility of the inorganic particles is excellent even in the coating, and uniform fusion enables obtainment of strong low-temperature sinterability.

Herein, the conductive paste of the present invention, in other words, is a composition consisting primarily of colloidal particles composed of the inorganic particles and the organic substances, and it may be a colloidal dispersion liquid further containing a dispersion medium. "Dispersion medium" is to disperse the colloidal particles in the dispersion liquid, and a portion of constituents of the colloidal particles may be dissolved into the "dispersion medium". Furthermore, "primary component" is a component with the greatest content out of the constituents.

Further, in the conductive paste of the present invention, it is preferable that the inorganic particles constituting the pigment is at least one type of metallic particles out of gold, silver, copper, nickel, bismuth, tin and platinum group elements. If the conductive paste with such configuration is used, a superior conductive property and heat resistance are also obtained.

The conductive paste of the present invention has a superior sintering characteristic especially at a low temperature (especially bonding application) when the content of the dispersion medium is 1 to 20% by weight, an octanol-water partition coefficient of the dispersion medium (log P value) is 1.5 to 5.5 and viscosity at 25° C. is 100 mPa·s to 1,000,000 mPa·s at $10\ s^{-1}$ of shear rate.

Herein, the octanol-water partition coefficient (log P value) is a value that is defined with a logarithmic value of a distribution ratio P ([concentration Co in octanol]/[concentration Cw in water]) in a two-component system of octanol/water as subject substances.

The log P value can be measured using a measurement method, specifically, such as a shake flask method. In one example of procedures in the shake flask method, purified water and octanol are mixed for 24 hours or longer to saturate each, and [the flask] is shaken in a state where the mixed solution is kept in the flask along with a sufficiently-purified measurement subject substance and the temperature is maintained. The flask is placed in a centrifuge to completely separate phases, and an amount of the measurement subject substance contained in each phase is measured with instrumental analysis (for example, high-performance liquid chromatography) that is suitable for the measurement subject substance, respectively. The concentration of the measurement subject substance in octanol Co and the concentration of the measurement subject substance in water Cw are obtained, respectively, and a log P value can be obtained by calculating a common logarithm of a concentration ratio.

Further, in the conductive paste of the present invention, it is preferable that the inorganic particles are generated by thermolysis after generating a complex compound containing the alkylamine and an inorganic compound containing an inorganic element constituting the inorganic particles. In this case, it is particularly preferable that the inorganic element is gold, silver or copper.

If the complex compound is generated to synthesize the inorganic particles as mentioned above, since it is unnecessary to use a reaction solvent unlike a normal synthesis system, this is advantageous from an environment aspect (reduction of input energy). Further, inorganic particulates that are fine and have small particle size distribution can be manufactured.

Effect of the Invention

According to the present invention, an conductive paste having low-temperature sinterability, and, having long-term dispersing stability can be provided. Further, according to the present invention, an conductive paste that has superior dispersing stability, and, that is preferably usable for bonding of metallic components comparatively at low temperature can be provided.

MODE FOR CARRYING OUT THE INVENTION

Hereafter, a preferred embodiment of the conductive paste of the present invention will be explained in detail.

Furthermore, the explanation hereafter merely mentions one embodiment of the present invention, but the present invention shall not be restricted because of these, and any redundant explanation may be omitted.

The conductive paste of the present embodiment is characterized such that [the conductive paste], containing:

inorganic particles having alkylamine with 6 or less of carbon number on at least a portion of a surface;

a polymer dispersant that has a pigment affinity group in a main chain and/or a plurality of side chains, and, that contains a polymer with a comb structure having a plurality of side chains constituting a solvation portion, a polymer having a plurality of pigment affinity portions made from a pigment affinity group in the main chain or a straight-chain polymer having a pigment affinity portion made from a pigment affinity group in one terminal of the main chain; and a dispersion medium; and a weight reduction percentage at the time of heating solid content of the conductive paste from room temperature to 500° C. by thermal analysis is 15% by weight or less.

Herein, as described above, the thermal analysis in the present invention is to conduct thermogravimetric analysis on solid content in the conductive paste of the present invention, for example, at 10° C./min of rate of temperature increase to obtain a weight reduction (weight reduction ratio). If the solid content is heated up to 500° C., organic substances and the like are oxidative dissolved and a majority is gasified and disappears. Consequently, a weight reduction by heating up to 500° C. shall substantially be equivalent to an amount of the organic substances in the solid content. In the conductive paste of the present embodiment, since the weight reduction ratio at the time of heating from room temperature to 500° C. according to thermal analysis is 15% by weight or less, it is inferred that a balance between volatilization of organic substances upon heating and fusion of metallic particles is excellent and [the conductive paste] excels in low-temperature sinterability.

For the conductive paste of the present embodiment, since the weight reduction ratio at the time of heating from room temperature to 500° C. is 15% by weight or less, because an amount of organic substances that will be evaporated on the occasion when the temperature becomes high due to the heating as mentioned above and fusion of metallic particles become active is comparatively small and it is difficult for integrity of connection of the fused metallic particles to be impaired, sufficient low-temperature sinterability can be obtained; therefore, an conductive property and thermal conductivity are also improved. If the weight reduction ratio at the time of heating from room temperature to 500° C. exceeds 15% by weight, when the temperature becomes high as mentioned above and the fusion of the metallic particle becomes active, since the organic substances are evaporated at once and exit as gas, the connection of the fused metallic particles becomes sparse.

Although the greater the weight loss ratio becomes, the more superior the dispersing stability of metallic colloids becomes, because the organic substance(s) remains after baking if [the weight loss ratio] is too great and this causes generation of voids, it will be a cause to reduce joint strength and an conductive property of the bonding layer. In particular, in order to obtain a bonding layer with a high conductive property by low-temperature bonding at 200° C., it is preferable that the weight loss ratio is 15% by weight or less. In the meantime, if the weight loss ratio is too small, because the dispersing stability in the colloid state is impaired, it is preferable that this is 0.01% by weight or less. A preferable range of the weight loss ratio is 0.05% to 7% by weight.

Furthermore, for a method to adjust the amount of organic substances, it will be described later, but it is easy to adjust by heating. The amount of organic substances can be adjusted by adjusting the amount of organic substances to be added on the occasion of producing the metallic particles. The washing conditions and the number of times of washing after the adjustment of the metallic particles can be changed. Heating can be performed by an oven or evaporator, and it may be performed under reduced pressure. In the case of heating under normal pressure, it can be performed in the atmosphere or in an inert atmosphere. In addition, amine or carboxylic acid can be added later for fine adjustment of the amount of organic substances later, as well.

For the conductive paste of the present embodiment, it is further preferable that the weight reduction ratio at the time of heating from room temperature to 200° C. according to the thermal analysis is 5% by weight or less, and, the weight reduction ratio at the time of heating from 200° C. to 500° C. is 5% by weight or less. Herein, the weight reduction ratio up to 200° C. indicates the content of low-temperature components (mainly, alkylamine with 6 or less of carbon number) that mainly contribute to the low-temperature sinterability, and the weight reduction ratio between 200° C. and 500° C. indicates the content of high-temperature components (mainly, a polymer dispersant) that mainly contribute to the dispersing stability.

If the low-temperature components become excessive, the dispersing stability is impaired, and if the high-temperature components become excessive, the low-temperature sinterability is impaired. In other words, if the weight reduction ratio at the time of heating from room temperature to 200° C. is 5% by weight or less, the dispersing stability is more superior, and if the weight reduction ratio at the time of heating from 200° C. to 500° C. is 5% by weight or less, the low-temperature sinterability is more superior.

The conductive paste of the present invention contains the metallic colloidal particles where colloidal particles become colloid, but regarding morphology of such metallic colloidal particles, for example, metallic colloidal particles that are constructed by attaching organic substances to a portion of surfaces of the metallic particles, metallic colloidal particles that are constructed by coating the surfaces with organic substances using the metallic particles as a core, and metallic colloid particles that are constructed by mixing those are exemplified, but the morphology is not particularly limited to these. Among them, the metallic colloidal particles that are constructed by coating the surfaces with organic substances using the metallic particles as a core are preferable. A person of ordinary skill in the art pertaining to the present invention can appropriately prepare the metallic colloid particle having the morphology above using a well-known technology in the field.

The conductive paste of the present embodiment is a fluent material consisting primarily of colloid particles composed of metallic particles and organic substances, and it may contain an organic substance not constituting the metallic colloid particles, a dispersion medium, a residual reducing agent or the like, in addition to the metallic particles and the organic substances constituting the metallic colloid particles.

Viscosity of the conductive paste of the present embodiment should be appropriately adjusted within a scope without impairing the effects of the present invention, and the viscosity at 25° C. is preferably 100 mPa·S to 1,000,000 mPa·S at 10 $s^{-1}$ of shear rate, and is more preferably 100 mPa·S to 100,000 mPa·S. A broad method can be applied as a method for applying an conductive paste on a substrate by setting the viscosity range (bonding application).

In addition, the viscosity of the conductive paste of the present embodiment should be within the viscosity range of, for example, 1 mPa·S to 5,000 mPa·S, and the viscosity range of 1 mPa·S to 1,000 mPa·S is more preferable, and the viscosity range of 1 mPa·S to 500 mPa·S is particularly preferable (ink application).

As a method to apply the conductive paste of the present embodiment over a substrate, a method can be appropriately selected and adopted from, for example, dipping, screen printing, a spray method, a bar-coating method, a spin-coating method, an inkjet method, a dispenser method, a pin transfer method, a stamping method, a coating method with a brush, a casting method, a flexo method, a photogravure method, an offset method, a transfer method, a hydrophobic/hydrophilic pattern method, a syringe method and the like.

The viscosity can be adjusted by adjusting particle size of the metallic particles, adjusting content of the organic substances, adjusting an additive amount of a dispersion medium and other components, adjusting a blending ratio of each component, or adding a thickener. The viscosity of the conductive paste of the present embodiment can be measured by a cone-plate viscometer (for example, Rheometer MCR301 manufactured by Anton Paar GmbH).

(1-1) Metallic Particles

Next, each component of the conductive paste of the present embodiment is explained. The metallic particles of the conductive paste of the present embodiment are not particularly limited, and for example, at least one type of gold, silver, copper, nickel, bismuth, tin, iron and platinum group elements (ruthenium, rhodium, palladium, osmium, iridium and platinum) is exemplified. As the metal, it is preferable to be at least one type of metallic particles selected from a group constituting gold, silver, copper, nickel, bismuth, tin and platinum group elements, and it is further preferable to be at least one type of copper or metal where its ionization tendency is smaller (nobler) than that of copper, i.e., gold, platinum, silver and copper. These metals can be singularly used or can be used by combining two or more types, and as a method for combination, there are a case of using alloy particles containing a plurality of metals and another case of using metallic particles having a core-shell structure or a multi-layered structure.

For example, in the case of using silver particles as the metallic particles of the conductive paste, the conductivity of the coating layer (coating film) formed by using the conductive paste of the present embodiment becomes excellent, but considering a problem of migration, using an conductive paste made from silver and other metal(s) enables to make the migration unlikely. As "other metal", metals where the ionization column is nobler than hydrogen, i.e., gold, copper, platinum and palladium are preferable.

Mean particle size of the metallic particles (or metallic colloid particles) in the conductive paste of the present embodiment should not be particularly limited as long as being within a range that will not impair the effects of the present invention, but it is preferable to have mean particle size so as to cause lowering of the melting point, and for example, it should be 1 nm to 200 nm. In addition, it is preferable to be 2 nm to 100 nm. If the mean particle size of the metallic particles is 1 nm or greater, the conductive paste that can form an excellent coating can be obtained, and it is useful because the cost to manufacture the metallic particles will not be high. Further, if it is 200 nm or less, it is preferable because it is difficult for the dispersibility of the metallic particles to be changed over time.

Further, it is also possible to add the metallic particles with size of micron meters as a combination as needed. In such case, excellent conductive paths can be obtained by lowering of the melting point in the metallic particles with size of nanometers around the metallic particles with a size of micron meters.

The inventors of the present invention, in the conductive paste containing amine that is attached to at least a portion of the surfaces of the metallic particles particularly using metallic particles with smaller particle size where such lowering of the melting point appears, have discovered that the low-temperature sinterability and the dispersing stability are improved in a balanced manner by optimizing a weight reduction ratio upon heating within a certain temperature range to be a specific range, compared to an conductive paste without any optimization.

Furthermore, the particle size of the metallic particles in the conductive paste of the present embodiment should not be uniform. Further, if the conductive paste contains a dispersion medium, a resin component(s), a thickener or a regulator of surface tension as an optional component, there is a case of containing the metallic colloidal particle component with the mean particle size exceeding 200 nm, and a particle component where its mean particle size exceeds 200 nm, as long as it is a component that does not cause agglomeration or does not remarkably impair the effects of the present invention.

Herein, the particle size of the metallic particles in the conductive paste of the present embodiment can be measured with dynamic light scattering, small angle X-ray scattering or a wide-angle X-ray diffraction method. In order to show lowering of the melting point of nanosize metallic particles, crystallite diameter that is obtained with the wide-angle X-ray diffraction method is appropriate. For example, in the wide-angle X-ray diffraction method, to be more specific, [the crystallite diameter] can be measured within a range of 30° to 80° of 2θ with a diffraction method, using RINT-Ultima III manufactured by Rigaku Corporation. In this case, a sample should be rolled thinly so as to flatten a surface over a glass plate with approximately 0.1 mm to 1 mm of recess in the center part for measurement. Further, a crystallite diameter (D) that is calculated by assigning a half-value width of an obtained diffraction spectrum to the following Scherrer's equation using JADE manufactured by Rigaku Corporation should be the particle size:

$$D=K\lambda/B\cos\theta$$

Herein, K represents Scherrer constant (0.9), λ represents wavelength of X-ray, B represents half-value width of diffraction line, and θ represents Bragg angle.

(1-2) Alkylamine with 6 or Less of Carbon Number

In the conductive paste of the present embodiment, alkylamine with 6 or less of carbon number that is attached to at least a portion of the surfaces of the metallic particles, i.e., "alkylamine with 6 or less of carbon number" in the metallic colloidal particles substantially constitutes a metallic colloid particle along with the metallic particles as a polymer dispersant to be described later. This is a concept where the organic substance does not contain trace organics contained in the metal as impurities from the beginning, trace organics that are contaminated in a manufacturing process to be mentioned later and attached to a metallic component(s), a residual reducing agent that could not be removed in a washing process and organic substances where their tiny amount is attached to metallic particles, such as a residual dispersant. Furthermore, "trace" above specifically intends to be less than 1% by weight in the metallic colloidal particle.

"Alkylamine with 6 or less of carbon number" is to coat metallic particles to prevent agglomeration of the metallic particles, and, to form metallic colloidal particles, and coating morphology will not be particularly prescribed. Furthermore, if this "alkylamine with 6 or less of carbon number" is chemically or physically bound to metallic particles, it is believed that it has been changed to anion or cation, as well, and in the present embodiment, a state of ion or a complex derived from this "alkylamine with 6 or less of carbon number" can be assumed.

"Alkylamine with 6 or less of carbon number" may be straight-line alkylamine or alkylamine having a side chain. As specific examples, methylamine, ethylamine, propylamine, butylamine, pentylamine and hexylamine are exemplified, and among them, at least one type selected from a group constituting butylamine, pentylamine and hexylamine is preferable from viewpoints of low-temperature sinterability and dispersing stability.

The amine may be a compound containing a functional group other than amine, such as a hydroxyl group, a carboxyl group, an alkoxy group, a carbonyl group, an ester group or a mercapto group. In this case, it is preferable that the number of nitrogen atoms derived from amine is the number of functional groups other than amine or greater. Further, the amine may be singularly used, respectively, and two or more types can be combined. In addition, it is preferable that a boiling point under normal pressure is 300° C. or less, and it is further preferable to be 250° C. or less.

It is preferable that the content of "alkylamine with 6 or less of carbon number" in the conductive paste of the present embodiment is 0.1% to 15% by weight. If the content of "alkylamine with 6 or less of carbon number" is 0.1% by weight or greater, the conductive property of the obtained conductive paste tends to be improved, and if it is 15% by weight or less, the dispersing stability of the conductive paste tends to be improved. The more preferable content of "alkylamine with 6 or less of carbon number" is 0.5% to 5% by weight, and the further preferable content is 0.5% to 4% by weight.

(1-3) Polymer Dispersant

A polymer dispersant contained in the conductive paste of the present embodiment is a polymer dispersant with a grafted structure where a pigment affinity group exists in a side chain, and that has a side chain constituting a solvation portion (polymer (1) with a comb structure); and is a polymer dispersant having a pigment affinity group in a main chain (polymer (copolymer) (2) and straight-chain polymer (3)). Consequently, dispersibility of colloidal particles composed of metallic particles is excellent, and this is preferable as a protective colloid for metallic particles. An conductive paste made from a metallic particle dispersant containing high concentration of metallic particles can be obtained by using the polymer dispersant.

For the polymer dispersant, the pigment affinity group indicates a functional group having strong adsorbability upon surfaces of pigments composed of metallic particles, and for example, a tertiary amino group, quaternary ammonium, a heterocyclic group having a basic nitrogen atom, a hydroxyl group, a carboxyl group and the like can be exemplified. In the present invention, the pigment affinity group indicates strong affinity to metallic particles. The high-molecular pigment dispersant can demonstrate sufficient performance as a protective colloid for metallic particles because of having the pigment affinity group.

The polymer with a comb structure (1) is structured where a plurality of side chains constituting a solvation portion are bound to a main chain along with a plurality of side chains having the pigment affinity group, and these side chains are bound to the main chain as if these are teeth of a comb. In the present specification, the structure above is referred to as a comb structure. In the polymer with the comb structure (1), a plurality of the pigment affinity groups can exist in not limited to a side-chain end, but in the middle of a side chain or a main chain. Furthermore, the solvation portion indicates a portion having affinity in a solvent, and is hydrophilic or hydrophobic structure. The solvation portion is composed with, for example, water-soluble polymer chain and oleophilic polymer chain.

The polymer with a comb structure (1) is not particularly limited, and for example, a polymer composed of poly(ethylenimine) or its acid salt with a structure that has one or more poly(carbonyl-carbonyl-$C_3$ to $C_6$-alkylene oxy) chains, and where each of these chains has 3 to 80 carbonyl-$C_3$ to $C_6$-alkyleneoxy groups, and that is bound to poly(ethylenimine) with amide or a salt cross-linked group disclosed in Japanese Patent Application Laid-Open No. H5-177123; a polymer that is composed of a reactive product of poly (lower alkylene) imine and polyester having an isolated carboxylic acid group, and where at least two polyester closed-chains are bound to each poly (lower alkylene) imine closed-chain disclosed in Japanese Patent Application Laid-Open No. S54-37082; a pigment dispersant that is obtained by reacting an amine compound and a pre-polymer containing a carboxyl group with 300 to 7,000 of number average molecular weight to a high-molecular-weight epoxy compound having an epoxy group at the terminal simultaneously or in optional sequence disclosed in Japanese Patent Application Laid-Open No. H7-24746 and the like can be exemplified.

For the polymer with a comb structure (1), it is preferable that 2 to 3,000 pigment affinity groups exist in one molecule. If [the number of the pigment affinity groups] is less than two, the dispersing stability is insufficient, and if it exceeds 3,000, the viscosity is too high and handling becomes difficult, and the particle size distribution of the colloidal particles made from metallic particles becomes separated more than necessary, and the dispersing stability may be lessened. It is more preferably 25 to 1,500.

For the polymer with a comb structure (1), it is preferable that 2 to 1,000 side chains constituting the solvation portion exist in one molecule. If [the number of the side chains] is less than two, the dispersing stability is insufficient, and if it exceeds 1,000, the viscosity is too high and handling becomes difficult, and the particle size distribution of the colloidal particles made from metallic particles becomes separated more than necessary, and the dispersing stability may be lessened. It is more preferably 5 to 500.

For the polymer with a comb structure (1), it is preferable that the number average molecular weight is 2,000 to 1,000,000. If it is less than 2,000, the dispersing stability is insufficient, and if it exceeds 1,000,000, the viscosity is too high and handling becomes difficult, and the particle size distribution of the colloidal particles made from metallic particles becomes separated more than necessary, and the dispersing stability may be lessened. It is more preferably 4,000 to 500,000.

The polymer (copolymer) (2) having a plurality of pigment affinity portions made from the pigment affinity groups in the main chain is a polymer where a plurality of pigment affinity groups are arranged along the main chain, and the pigment affinity groups, for example, are pendant to the main chain. In this specification, the pigment affinity portion is a portion where one or more pigment affinity groups exist, and that functions as an anchor to be absorbed onto the pigment surface.

As the copolymer (2), for example, a reactant with polyisocyanate, a mixture of a monohydroxy compound and monohydroxy monocarboxylic acid or a monoamino monocarboxylic acid compound, and a compound having at least one basic ring nitrogen and an isocyanate reactive group disclosed in Japanese Patent Application Laid-Open No. H4-210220; a polymer where a plurality of tertiary amino groups or groups having a basic cyclic nitrogen atom are attached to a main chain composed of polyurethane/polyurea disclosed in Japanese Patent Application Laid-Open Nos. S60-16631, H2-612 and S63-241918; copolymer that is a copolymer composed of a steric stabilization unit having a water-soluble poly(oxyalkylene) chain, a structure unit and an amino group-containing unit, and where the amine group-containing single dose monomer unit contains a tertiary amino group or a group of its acid addition salt or a group of quaternary ammonium, and that contains an amino group equivalent to 0.025 mm to 0.5 mm per gram of the copolymer; and an amphiphilic polymer that is an amphiphilic polymer composed of a main chain made from an addition polymer and a stabilization unit made from at least one $C_1$-$C_4$ alkoxypolyethylene or polyethylene-copropylene glycol(meta)acrylate, and, having 2,500 to 20,000 of weight-average molecular weight, wherein the main chain contains up to 30% by weight of a nonfunctional structure unit and a total of up to 70% by weight of a stabilizer unit and a functional unit; the functional unit is substituted or not-substituted stylene-containing unit, a hydroxyl group unit and a carboxyl group-containing unit; and ratios of a hydroxyl group to a carboxyl group, a hydroxyl group to a stylene group and a hydroxyl group to a propyleneoxy group or an ethyleneoxy group are 1:0.10 to 26.1, 1:0.28 to 25.0, and 1:0.80 to 66.1, respectively, can be exemplified.

For the copolymer (2), it is preferable that 2 to 3,000 pigment affinity groups exist in one molecule. If [the number of pigment affinity groups] is less than 2, the dispersing stability is insufficient, and if it exceeds 3,000, the viscosity is too high and handling becomes difficult, and the particle size distribution of the colloidal particles made from metallic particles becomes separated more than necessary, and the dispersing stability may be lessened. It is more preferably 25 to 1,500.

For the copolymer (2), it is preferable that the number average molecular weight is 2,000 to 1,000,000. If it is less than 2,000, the dispersing stability is insufficient, and if it exceeds 1,000,000, the viscosity is too high and handling becomes difficult, and the particle size distribution of the colloidal particles made from metallic particles becomes separated more than necessary, and the dispersing stability may be lessened. It is more preferably 4,000 to 500,000.

The straight-chain polymer (3) having a pigment affinity portion composed of pigment affinity group(s) at one terminal of the main chain has a pigment affinity portion composed of one or more pigment affinity groups only at one terminal of the main chain, and has sufficient affinity to the pigment surface.

The straight-chain polymer (3) is not particularly limited, and for example, an A-B block type polymer where one is basic, disclosed in Japanese Patent Application Laid-Open No. S46-7294; an A-B block type polymer where aromatic carboxylic acid is introduced into an A block, disclosed in the specification of U.S. Pat. No. 4,656,226; an A-B block type polymer where one terminal is a basic functional group, disclosed in the specification of U.S. Pat. No. 4,032,698; an A-B block type polymer where one terminal is an acidic functional group, disclosed in the specification of U.S. Pat. No. 4,070,388; an A-B block type polymer where one terminal is a basic functional group, disclosed in the specification of U.S. Pat. No. 4,032,698; one where weathering and yellowing deterioration of the A-B block type polymer, where aromatic carboxylic acid is introduced into an A block, described in the specification of U.S. Pat. No. 4,656,226 has been improved as disclosed in Japanese Patent Application Laid-Open No. H1-204914 and the like can be exemplified.

For the straight-chain polymer (3), it is preferable that 2 to 3,000 pigment affinity groups exist in one molecule. If [the number of pigment affinity groups] is less than 2, the dispersing stability is insufficient, and if it exceeds 3,000, the viscosity is too high and handling becomes difficult, and the particle size distribution of the colloidal particles made from metallic particles becomes separated more than necessary, and the dispersing stability may be lessened. It is more preferably 5 to 1,500.

For the straight-chain polymer (3), it is preferable that the number average molecular weight is 1,000 to 1,000,000. If it is less than 1,000, the dispersing stability is insufficient, and if it exceeds 1,000,000, the viscosity is too high and handling becomes difficult, and the particle size distribution of the colloidal particles made from metallic particles becomes separated more than necessary, and the dispersing stability may be lessened. It is more preferably 2,000 to 500,000.

As the polymer dispersant, commercially-available ones can also be used. As the commercial items, for example, SOLSPERSE 11200, SOLSPERSE 13940, SOLSPERSE 16000, SOLSPERSE 17000, SOLSPERSE 18000, SOLSPERSE 20000, SOLSPERSE 24000, SOLSPERSE 26000, SOLSPERSE 27000 and SOLSPERSE 28000 (manufactured by The Lubrizol Corporation); DISPERBYK 142, DISPERBYK 160, DISPERBYK 161, DISPERBYK 162, DISPERBYK 163, DISPERBYK 166, DISPERBYK 170, DISPERBYK 180, DISPERBYK 182, DISPERBYK 184, DISPERBYK 190 and DISPERBYK 2155 (manufactured by BYK Japan KK); EFKA-46, EFKA-47, EFKA-48 and EFKA-49 (manufactured by EFKA Chemicals); Polymer 100, Polymer 120, Polymer 150, Polymer 400, Polymer 401, Polymer 402, Polymer 403, Polymer 450, Polymer 451, Polymer 452, Polymer 453 (manufactured by EFKA Chemicals); Ajisper PB711, Ajisper PA111, Ajisper PB811 and Ajisper PW911 (manufactured by AJINOMOTO Co., Ltd.); Flowlen DOPA-15B, Flowlen DOPA-22, Flowlen DOPA-17, Flowlen TG-730W, Flowlen G-700 and Flowlen TG-720W (manufactured by KYOEISHA CHEMICAL Co., Ltd.) and the like can be exemplified.

It is preferable that the polymer dispersant is either SOLSPERSE 11200, SOLSPERSE 13940, SOLSPERSE 16000, SOLSPERSE 17000, SOLSPERSE 18000, SOLSPERSE 28000, DISPERBYK 142 or DISPERBYK 2155 among these, from the viewpoint of low-temperature sinterability and dispersing stability.

It is preferable that the content of the polymer dispersant in the conductive paste of the present embodiment is 0.1% to 15% by weight. If the content of the polymer dispersant is 0.1% by weight or greater, the dispersing stability of the obtained conductive paste tends to be improved, and if it is 15% by weight or less, the conductive property of the conductive paste tends to be improved. The preferable content of the polymer dispersant is 0.5% to 5% by weight, and the further preferable content is 0.5% to 4% by weight.

(1-4) Dispersion Medium

The conductive paste of the present embodiment contains a dispersion medium to disperse metallic particles, which are pigments. As such dispersion medium, conventionally-known ones can be usable, and among them, it is preferable that the dispersion medium has log P (octanol-water partition coefficient) within the range of 1.5 to 5.5. If the dispersion medium has log P (octanol-water partition coefficient) within the range of 1.5 to 5.5, an conductive paste having more excellent dispersing stability can be obtained. Even if the log P value is out of the range above, the dispersing stability can be obtained, but a colloidal dispersion liquid that is slightly inferior to long-term dispersing stability tends to be obtained.

Herein, the log P value is a value that is defined with a logarithmic value for a distribution ratio P (=[Concentration in octanol Co]/[Concentration in water Cw] in a two-component system of octanol/water of the compound as mentioned above, and it is an index of hydrophobicity of chemical substance. As a specific measurement method for a log P value, for example, a shake-flask method is exemplified. Sufficiently-purified water and octanol are mixed for 24 hours or longer and they are saturated, respectively, and these are placed into a flask along with a sufficiently-purified measurement subject substance, and the flask is shaken well at a maintained temperature. The obtained mixture is centrifuged for complete phase separation, and quantity of samples contained in the phases is determined, respectively. The concentration in octanol Co and the concentration in water Cw are obtained, respectively, and a common logarithm of a ratio of concentration is calculated.

As a specific example of the dispersion medium, various compounds are exemplified, and among them, at least one type selected from a group constituting diethylene glycol dibutyl ether (log P value: 1.9), isotridecanol (log P value: 5.4), tetralin (log P value: 3.5), cyclohexylbenzene (log P value: 4.9), terpineol (log P value: 1.8), dihydroterpioneol (log P value: 2.7), dihydroterpinylacetate (log P value: 3.4), and p-cymene (log P value: 4.1) is preferable from viewpoints of long-term dispersing stability and reducibility.

It is preferable that the content of the dispersion medium in the conductive paste of the present embodiment is 10% to 90% by weight. If the content of the dispersion medium is 10% by weight or greater, stable dispersibility tends to be obtained, and if it is 90% by weight or less, a coating formed from ink tends to express an excellent conductive property. The more preferable content of the dispersion medium is 20% to 80% by weight, and further preferable content is 30% to 70% by weight.

It is preferable that 0.5% to 10% by weight of fatty acid with 150° C. or higher of boiling point is added to the dispersion medium in the conductive paste of the present embodiment. Containing the fatty acid in the dispersion medium enables to moderately delay a deposition rate (baking rate) of metallic particles, and volatilization of organic components and deposition of the metallic particles become well-balanced, and a more solid bonding layer can be obtained.

The fatty acid can have at least one carboxylic group, and may have a functional group other than the carboxyl group. It is preferable that the fatty acid is at least one type to be selected from a group constituting stearic acid, oleic acid, linoleic acid, linolenic acid and ricinoleic acid. Further, if the carbon number of the fatty acid is 18 or greater, the volatilization of organic components and the deposition of the metallic particles become well-balanced, and a more solid bonding layer can be obtained.

It is preferable that the content of dispersion medium in the conductive paste of the present embodiment is 1% to 20% by weight. If the content of the dispersion medium is 1% by weight or greater, stable dispersibility tends to be obtained, and if it is 20% by weight or less, voids to be formed after sintering can be suppressed, and it can be preferably used for a composition for metal bonding.

(1-5) Other Components

Any components, such as a dispersion medium; an oligomer component that fulfills a role, for example, as a binder; a resin component; an organic solvent (a portion of solid content may be dissolved or dispersed); a surfactant; a thickener or a regulator of surface tension, can be added to the components above, in order to add functions, such as moderate viscosity, adhesiveness, drying characteristic or printability, according to the intended use, within a scope not impairing the effects of the present invention. Such optional components are not particularly limited.

As the dispersion medium out of the optional components, various substances are usable within a scope not impairing the effects of the present invention, and for example, hydrocarbon, alcohol and the like can be exemplified.

As hydrocarbon, aliphatic hydrocarbon, cyclic hydrocarbon, alicyclic hydrocarbon and the like are exemplified, and each can be used singularly, and two or more can be combined. As aliphatic hydrocarbon, for example, saturated or unsaturated aliphatic hydrocarbon, such as tetradecane, octadecane, heptamethylnonane, tetramethylpentadecane, hexane, heptanes, octane, nonane, decane, tridecane, methylpentane, normal paraffin or isoparaffin, is exemplified. As cyclic hydrocarbon, for example, toluene, xylene and the like are exemplified. In addition, as alicyclic hydrocarbon, for example, limonene, dipentene, terpinene, terpinene (also referred to as terpinene), nesol, sinen, orange flavor, terpinolene, terpinolene (also referred to as terpinolene), phellandrene, menthadiene, terebene, dihydrocymene, moslene, isoterpinene, isoterpinene (also referred to as isoterpinene), crithmene, kautschin, cajeputene, oilimene, pinene, turpentine, menthane, pinane, terpene, cyclohexane and the like are exemplified.

Further, alcohol is a compound containing one or more OH groups in a molecular structure, and aliphatic alcohol, cyclic alcohol and alicyclic alcohol are exemplified, and each can be used singularly or two or more types can be combined. Further, a portion of the OH groups may be induced by an acetoxy group or the like within a scope not impairing the effects of the present invention.

As aliphatic alcohol, for example, saturated or unsaturated $C_{6-30}$ aliphatic alcohols, such as heptanol, octanol (such as 1-octanol, 2-octanol or 3-octanol), decanol (such as 1-decanol), lauryl alcohol, tetradecyl alcohol, cetyl alcohol, 2-ethyl-1-hexanol, octadecyl alcohol, hexadecenol or oleyl alcohol, are exemplified. As cyclic alcohol, for example, cresol, eugenol and the like are exemplified. In addition, as alicyclic alcohol, for example, cycloalkanol, such as cyclohexanol; terpene alcohol (such as mono terpene alcohol), such as terpineol alcohol (containing α, β or γ isomer, or any mixture of these); and dihydroterpioneol, myrtenol, sobrerol, menthol, carveol, perillyl alcohol, pinocarveol, sobrerol, verbenol and the like are exemplified.

As the resin component, for example, polyester resin; polyurethane resin, such as blocked isocyanate; polyacrylate resin; polyacrylamide resin; polyether resin; melamine resin; or terpene resin can be exemplified, and these may be used singularly, respectively, and two or more types can be combined.

As an organic solvent, except for the ones exemplified as the dispersion medium, for example, methyl alcohol, ethyl alcohol, n-propyl alcohol, 2-propyl alcohol, 1,3-propanediol, 1,2-propanediol, 1,4-butanediol, 1,2,6-hexane triol, 1-ethoxy-2-propanol, 2-butoxy ethanol, ethylene glycol, diethylene glycol, triethylene glycol, polyethylene glycol with weight-average molecular weight between 200 and 1,000, propylene glycol, dipropylene glycol, tripropylene glycol, polypropylene glycol with weight-average molecular weight between 300 and 1,000, N,N-dimethylformamide, dimethylsulfoxide, N-methyl-2-pyrrolidone, N,N-dimethylacetamide, glycerin, acetone and the like are exemplified, and these may be used singularly, respectively, and two or more types can be combined.

As the thickener, for example, clay minerals, such as clay, bentonite or hectorite; for example, emulsion, such as polyester emulsion resin, acrylic emulsion resin, polyurethane emulsion resin or blocked isocyanate; cellulose derivatives, such as methylcellulose, carboxymethylcellulose, hydroxyethyl cellulose, hydroxypropylcellulose or hydroxypropyl methylcellulose; polysaccharide, such as xanthane gum or guar gum, and the like are exemplified, and these may be used singularly, respectively, and two or more types can be combined.

A surfactant may be added. In a multi-component solvent-series metallic colloidal dispersion liquid, roughness on a coating surface and a bias of solid content easily occur due to a difference in a rate of volatilization upon drying. Addition of a surfactant to the conductive paste of the present embodiment enables to suppress these disadvantages and to obtain an conductive paste that can form a uniform coating.

The surfactant that is usable in the present embodiment is not particularly limited, and any of anionic surfactants, cationic surfactants, and nonionic surfactants are usable, and for example, alkyl benzene sulfonate, quaternary ammonium salt and the like are exemplified. Since effects can be obtained with a small additive amount, a fluorochemical surfactant is preferable.

(2) Preparation of Conductive Paste

Next, in order to manufacture the conductive paste containing the metallic colloids of the present embodiment, metallic particles (metallic colloidal particles) coated with "alkylamine with 6 or less of carbon number" as a main component are prepared.

Furthermore, the adjustment of an amount of "alkylamine with 6 or less of carbon number" and a weight reduction percentage is not particularly limited, but it is easy to adjust with heating. The amount of "alkylamine with 6 or less of carbon number" to be added on the occasion of preparation of the metallic particles may be adjusted. The conditions of washing and/or the number of times of washing after the preparation of the metallic particles may be changed. Further, heating can be performed with an oven, an evaporator or the like. Heating temperature should be within the range of approximately 50° C. to 300° C., and a heating time should be for several minutes to several hours. Heating may be performed under reduced pressure. An amount of the organic substances can be adjusted at lower temperature by heating under reduced pressure. In the case of performing under normal pressure, it can be heated in the atmosphere or in an inert atmosphere, as well. In addition, amine can be added for fine adjustment of an amount of the organic substances, as well.

A method for preparing the metallic particles coated with "alkylamine with 6 or less of carbon number" in the present embodiment is not particularly limited, and for example, a method where a dispersion liquid containing metallic particles is prepared, and next this dispersion liquid is washed or the like is exemplified. As a process to prepare the dispersion liquid containing the metallic particles, for example, as mentioned below, metallic salt (or metallic ion) dissolved in a solvent should be reduced, and as reduction procedures, procedures based upon a chemical reduction method should be adopted. Further, a metal amine complex method can also be used (details will be described later).

In other words, the metallic particles coated with "alkylamine with 6 or less of carbon number" can be prepared by reducing a raw material solution containing metallic salt of metal constituting the metallic particles, "alkylamine with 6 or less of carbon number", the polymer dispersant and the dispersion medium. Furthermore, a portion of components in the raw material solution may not be dissolved but dispersed, and water may be contained.

This reduction enables to obtain metallic colloidal particles where "alkylamine with 6 or less of carbon number" is attached to at least a portion of surfaces of the metallic particles. This metallic colloidal particle can be supplied as is as the conductive paste of the present embodiment, but it can be obtained as an conductive paste made from a metallic colloidal dispersion liquid by adding this into a dispersion medium in the process described below as needed.

As a starting material for obtaining metallic particles coated with "alkylamine with 6 or less of carbon number", various well-known metallic salts or their hydrates can be used, and for example, silver salts, such as silver nitrate, silver sulfate, silver chloride, silver oxide, silver acetate, silver oxalate, silver formate, silver nitrite, silver chlorate or silver sulfide; for example, gold salts, such as chlorauric acid, gold potassium chloride or gold sodium chloride; for example, platinum salts, such as chloroplatinic acid, platinum chloride, platinum oxide or potassium chloroplatinate;

for example, palladium salts, such as palladium nitrate, palladium acetate, palladium chloride, palladium oxide or palladium sulfate, and the like are exemplified, but salts are not particularly limited as long as they can be dissolved in any appropriate dispersion solvent, and, are reducible.

Further, a method to reduce these metal salts in the raw material liquid is not particularly limited, and for example, a method using a reducing agent, a method to irradiate a light, such as ultraviolet rays, electron beams, ultrasonic waves or thermal energy and the like are exemplified. Among them, the method using a reducing agent is preferable from a viewpoint of easy operation.

As the reducing agent, for example, amine compounds, such as dimethylaminoethanol, methyldiethanolamine, triethanolamine, phenidone or hydrazine; for example, hydrogen compounds, such as sodium borohydride, iodinated hydrogen or hydrogen gas; for example, oxides, such as carbon monoxide or sulfurous acid; for example, low-valent metallic salts, such as ferrous sulfate, ferric oxide, iron fumarate, ferrous lactate, iron oxalate, ferric sulfide, tin acetate, tin chloride, diphosphate tin, tin oxalate, tin oxide or tin sulfate; for example, sugar, such as ethylene glycol, glycerin, formaldehyde, hydroquinone, pyrogallol, tannin, tannic acid, salicylic acid or D-glucose, and the like are exemplified, but reducing agents are not particularly limited as long as these are dissolved into a dispersion medium and can reduce the metallic salts above. In the case of using the reducing agents, a reduction reaction can be accelerated by adding a light and/or heat.

As a specific method to prepare metallic particles coated with "alkylamine with 6 or less carbon number" using the metallic salt, "alkylamine with 6 or less carbon number", a dispersion medium and a reducing agent, for example, a method where the metallic salt is dissolved into an organic solvent (for example, toluene or the like) to prepare a metallic salt solution, an organic substance as a dispersant is added into the metallic salt solution, and next, a solution where the reducing agent has been dissolved is gradually instilled into [this mixture] and the like are exemplified.

A counter ion of the metallic salt, a residue of the reducing agent and the dispersant other than the metallic particles exist in a dispersion liquid containing the metallic particles coated with "alkylamine with 6 or less of carbon number" obtained as mentioned above, and electrolyte concentration and organic substance concentration of the entire liquid tends to be high. Since the liquid in such condition has high conductivity, coagulation of the metallic particles occurs and they are easily precipitated. Alternatively, even if [the metallic particles] are not precipitated, if a counter ion of metallic salt, a residue of the reducing agent or a more than necessary amount for dispersion of excess dispersant remains, the conductive property may be deteriorated. Then, the metallic particles coated with an organic substance can be certainly obtained by washing the solution containing the metallic particles to remove any excessive residues.

As the washing method, for example, a method to repeat a process where a dispersion liquid containing the metallic particles coated with "alkylamine with 6 or less of carbon number" is set stationary for a certain period of time, and after a generated supernatant solution is removed, alcohol (such as methanol) is added and [the mixture] is stirred again, and [the mixture] is further set stationary for a certain period of time and the generated supernatant solution is removed, several times; a method for centrifugal separation instead of setting stationary; a method for demineralization by an ultrafiltration apparatus or ion-exchange equipment and the like are exemplified. The metallic particles coated with "alkylamine with 6 or less of carbon number" of the present embodiment can be obtained by removing excess residues with such washing, and, by removing an organic solvent.

Among the present embodiments, the metallic colloidal dispersion liquid is obtained by mixing the metallic particles coated with "alkylamine with 6 or less of carbon number" obtained above and the dispersion medium explained in the present embodiments. Such method for mixing the metallic particles coated with "alkylamine with 6 or less of carbon number" and a dispersion medium is not particularly limited, and it can be conducted with a conventionally well-known method using an agitator or a stirrer. [Mixing] can be stirred with a spatula, and an ultrasonic homogenizer with appropriate output may be aimed When a metallic colloidal dispersion liquid containing a plurality of metals is obtained, the manufacturing method is not particularly limited, and for example, if a metallic colloidal dispersion liquid made from silver and other metal(s) is manufactured, a dispersion liquid containing metallic particles and another dispersion liquid containing other metallic particles are separately manufactured in the preparation of metallic particles coated with the organic substance above, and these may be mixed later, and a silver ion solution and other metallic ion solution may be mixed and then be reduced.

In the case of using the metallic amine complex, for example, metallic particles may be manufactured with a first step to mix alkylamine with 6 or greater of carbon number, an amine mixed liquid containing alkylamine with 5 or less of carbon number and a metallic compound containing a metallic atom(s) to produce a complex compound containing the metallic compound and amine; and a second step to decompose the complex compound by heating to produce metallic particles.

For example, silver particles protected with a protective film of alkylamine can be manufactured by heating a metallic compound, such as silver nitrate containing silver, and a complex compound generated from alkylamine in the presence of alkylamine, and by agglutinating atomic silver that is generated by decomposing a metallic compound of oxalate ion(s) contained in the complex compound.

Thus, in the metallic amine complex decomposition method for manufacturing metallic particles coated with amine, because atomic metal is generated by decomposition reaction of a metallic amine complex, which is single variety of molecule, it is possible to uniformly generate an atomic metal within a reaction system, and compared to a case of generating a metallic atom due to reaction between/among a plurality of components, unevenness of reaction caused by composition fluctuations of components constituting the reaction is suppressed, and it is advantageous particularly on the occasion of manufacturing a large quantity of metallic powder on an industrial scale.

Further, in the metallic amine complex decomposition method, an alkylamine molecule coordinate-bonds with a metallic atom to be generated, and it is inferred that movement of the metallic atom on the occasion of generating agglomeration is controlled by a function of the alkylamine molecule coordinated in the metallic atom. As a result, according to the metallic amine complex decomposition method, it becomes possible to manufacture very fine metallic particles with narrow particle size distribution.

In addition, many alkylamine molecules generate comparatively weak force of coordinate bond on the surface of metallic fine particles to be manufactured, as well, and because these form a dense protective coating on the surfaces of the metallic particles, it becomes possible to manufacture coated metallic particles where their surfaces excelling in preservation stability are clean. Further, because the alkylamine molecules forming the coating are easily detachable by heating or the like, it becomes possible to manufacture metallic particles, which are sinterable at a very low temperature.

Further, on the occasion of generating a composite compound, such as a complex compound, by mixing a solid metallic compound and amine, generation of a composite compound, such as a complex compound, becomes easy by mixing and using short-chain alkylamine with 5 or less of carbon number into long-chain/medium-chain alkylamine mainly constituting a coating comprising coated silver particles, and it becomes possible to manufacture a composite compound by mixing for a short time. Further, it is possible to manufacture coated silver particles having characteristics according to various use applications by mixing and using the short-chain alkylamine.

Although the conductive paste of the present embodiment obtained as mentioned above is usable as a composition for metal bonding as is, various inorganic components and/or organic components can be added within a range not impairing the dispersion stability and the low-temperature sinterability of the conductive paste.

(3) Application Method

If the conductive paste of the present embodiment is used, after applying onto a substrate, [the conductive paste] is sintered at heating and baking at a comparatively low temperature (for example, 300° C. or less, preferably 150° C. to 250° C.) to enable obtainment of an conductive coating. On the occasion of sintering, the temperature can be increased and decreased in a step-by-step manner, as well. Further, it is also possible to pre-apply a surfactant or a surface-active agent on a surface where the conductive paste is applied.

Herein, "application" of the conductive paste of the present embodiment is a concept including a case of applying the conductive paste in a planar manner and a case of applying (drawing) in a linear manner, as well. It is possible for the configuration of the applied coating made from the conductive paste before heating/baking to be a desired configuration. Therefore, the coating of the conductive paste of the present embodiment sintered by heating and baking is a concept including both the planer coating and the linear coating, and these planar coating and linear coating can be continuous and discontinuous, and can include a continuous portion(s) and a discontinuous portion(s).

A substrate that is usable in the present embodiment should be able to be sintered by applying the conductive paste and by heating and baking [the conductive paste], and it is not particularly limited, but it is preferable to be a member that is equipped with heat resistance to a degree of not being damaged at a temperature upon heating and baking.

As a material constituting such substrate, for example, polyester, such as polyamide (PA), polyimide (PI), polyamide-imide (PAI), polyethylene terephthalate (PET), polybutylene terephthalate (PBT) or polyethylene naphthalate (PEN); polycarbonate (PC), polyether sulfone (PES), vinyl resin, fluorine resin, liquid crystal polymer, ceramics, glass, metal and the like can be exemplified.

Further, the substrate may be in various configurations, for example, plate-like or strip-like, and it may be rigid or flexible. The thickness of the substrate can be appropriately selected. For improvement of bonding property or adhesiveness or for other purpose, a member where a surface layer is formed or a member where a surface treatment, such as a hydrophillic treatment, is applied may be used.

It is possible to use various methods in a step to apply the conductive paste onto a substrate, and as described above, the method can be appropriately selected and used from, for example, dipping, screen printing, spraying, bar-coating, spin-coating, inkjet, dispenser, a pin transfer method, a stamping method, an application system with a brush, casting, flexo, gravure, an offset method, a transfer method, a hydrophilic and hydrophobic pattern method, a syringe and the like.

In the present embodiment, if the conductive paste contains a binder component, the binder component shall be sintered from a viewpoint of improvement of strength of a coating and the like, but the binder component can be all removed by controlling baking conditions, by regarding the adjustment of viscosity of the conductive paste for applying to various printing methods depending upon circumstances as principal purposes of the binder component.

The method for heating/baking is not particularly limited, but [the conductive paste] can be sintered by heating/baking so as to cause a temperature of the conductive paste applied or drawn on the substrate, for example, at 300° C. or less, using, for example, a conventionally well-known oven or the like. The lower limit of the temperature for heating/baking is not always limited, and it can be a temperature within a scope of not impairing the effects of the present invention. Herein, in the coating after sintering, the smaller residual volume of the organic substance is better from a point to obtain higher strength as much as possible, but a portion of the organic substance may remain within a scope of not impairing the effects of the present invention.

(4) Bonding Method

If the composition for metal bonding (conductive paste) of the present embodiment is used, high joint strength can be obtained in bonding of members in association with heating. In other words, a first member to be joined and a second member to be joined can be joined using an application step of a bonding composition to apply the composition for metal bonding between the first member to be joined and the second member to be joined, and a bonding step to bake and join the composition for bonding that has been applied between the first member to be joined and the second member to be joined at a desired temperature (for example, 300° C. or less, preferably 150° C. to 250° C.).

On the occasion of this bonding step, pressure can be applied to a direction where the first member to be joined and the second member to be joined are diagonal, but it is one of the advantages of the present invention to enable obtainment of sufficient joint strength without particular pressurization. Further, on the occasion of baking, the temperature can be decreased and increased in a phased manner. Further, it is also possible to pre-apply a surfactant or a surface-active agent onto a bonding member surface(s).

The inventors of the present invention, as a result of keen study, have discovered that the first member to be joined and the second member to be joined can be more securely joined with high joint strength (a joined body can be obtained) if the composition for metal bonding of the present embodiment is used as the composition for metal bonding in the application step of the composition for metal bonding.

Herein, "application" of the composition for metal bonding of the present embodiment is a concept including a case of planarly applying and a case of linearly applying (drawing) the composition for metal bonding, as well. It is possible to form the configuration of the coating made from the composition for metal bonding in the applied condition before baking by heating to the desired configuration. Therefore, in the joined body of the present embodiment after baking heating, the composition for metal bonding is a concept including both the planar bonding layer and the linear bonding layer, as well, and these planar bonding layer and linear bonding layer may be continuous or discontinuous, and can contain a continuous portion(s) and a discontinuous portion(s).

As the first member to be joined and the second member to be joined that are usable in the present embodiment, they should be ones that can be joined by applying the composition for metal bonding and baking with heating, and there are no limitations, but a member that has a characteristic of heat resistance to a degree of not being damaged by temperature upon bonding is preferable.

As a material constituting such member to be joined, for example, polyester, such as polyamide (PA), polyimide (PI), polyamideimide (PAI), polyethylene terephthalate (PET), polybutylene terephthalate (PBT) or polyethylene naphthalate; polycarbonate (PC), polyether sulfone (PES), vinyl resin, fluorine resin, liquid crystal polymer, ceramics, glass, metal and the like can be exemplified, and metallic members to be joined are preferable among them. The reason why the metallic members to be joined are preferable is because they excel in the heat resistance, and, excel in affinity with the composition for metal bonding of the present invention where inorganic particles are metal.

Further, the member to be joined can be in various shapes, such as sheet-like or strip-like, and it can be rigid or flexible. Thickness of the substrate can also be appropriately selected. For improvement of bonding property or adhesiveness or for other purposes, a member where a surface layer is formed or a member where a surface treatment, such as a hydrophillic treatment, is applied may be used.

It is possible to use various methods in a step to apply the conductive paste for metal bonding onto members to be joined, and as described above, for example, the method can be appropriately selected and used from dipping, screen printing, spraying, bar coating, spin coating, inkjet, a dispenser, a pin transfer method, a stamping method, an application system with a brush, casting, flexo, gravure, an offset method, a transfer method, a hydrophilic and hydrophobic pattern method and a syringe.

The coating as mentioned above is baked by heating at temperature, for example, 300° C. or less, within the range of not damaging the members to be joined, and a joined body of the present embodiment can be obtained. In the present embodiment, as mentioned above, because the composition for metal bonding of the present embodiment is used, a bonding layer having superior adhesiveness to the members to be joined is obtained, and strong joint strength can be more securely obtained.

In the present embodiment, when the composition for metal bonding contains a binder component, the binder component shall also be sintered according to viewpoints of improvement of strength of the bonding layer and improvement of joint strength between the members to be joined, but the binder component may be all removed by controlling baking conditions by regarding adjustment of viscosity of the composition for bonding as a principal purpose for applying to various printing methods.

A method for baking is not particularly limited, but bonding can be performed by baking, for example, so as to adjust a temperature of the composition for metal bonding applied or drawn on the members to be joined at 300° C. or less, using for example, a conventionally well-known oven or the like. The lower limit of the baking temperature is not always limited, but it is preferable that it is a temperature where the members to be joined can be joined, and, a temperature within a range of not impairing the effects of the present invention. Herein, in the composition for metal bonding after baking, the smaller remaining amount of the organic substance is better from a point to obtain higher joint strength as much as possible, but a portion of the organic substance may remain within the range of not impairing the effects of the present invention.

Furthermore, an organic substance(s) is contained in the composition for metal bonding of the present invention, but unlike a conventional one utilizing thermal curing, such as an epoxy resin, this does not obtain the joint strength after baking due to action of the organic substance(s), but it obtains sufficient joint strength due to fusion of the fused metallic particles as described above. Consequently, after bonding, even if the organic substance(s) remained because of placing in a usage environment where its temperature is higher than the bonding temperature is deteriorated or decomposed/has disappeared, there is no possibility to cause reduction of the joint strength; therefore, it excels in the heat resistance.

According to the composition for metal bonding of the present embodiment, because a joint having a bonding layer expressing a high conductive property can be realized even by baking with low-temperature heating, for example, at approximately 150° C. to 250° C., the members to be joined, which are comparatively weak against heat, can be joined. Further, the baking time is not particularly limited, but it should be a baking time that can cause bonding according to the baking temperature.

In the present embodiment, in order to further enhance the adhesiveness between the members to be joined and the bonding layer, the surface treatment can be applied to the members to be joined. As the surface treatment method, for example, a method of performing dry processing, such as corona treatment, plasma treatment, UV treatment or electron-beam treatment; a method where a primer layer or an conductive paste receptive layer is pre-established on a substrate and the like are exemplified.

Thus, typical embodiments of the present invention have been explained, but the present invention should not be limited to these. For example, in the embodiments above, the metallic colloidal dispersion liquid where metallic particles have been adopted as inorganic particles were explained, and for example, inorganic particles, such as tin-doped indium oxide, alumina, barium titanate or phosphoric acid iron lithium, excelling in an conductive property, thermal conductivity, dielectricity and ion conductivity can also be used.

Hereafter, the conductive paste of the present invention will be further explained in examples, but the present invention should not be limited to these example at all.

EXAMPLE

Experiment 1

Example 1

Toluene (first class grade chemicals manufactured by Wako Pure Chemical Industries, Ltd.) (200 ml) and 15 g of hexylamine (first class grade chemicals manufactured by Wako Pure Chemical Industries, Ltd.) were mixed and sufficiently stirred with a magnetic stirrer. While stirring, 10 g of silver nitrate (special grade chemicals manufactured by Toyo Chemical Industrial Co., Ltd.) was added into this mixture, and after the silver nitrate was dissolved, 10 g of SOLSPERSE 11200 and 10 g of hexanoic acid (special grade chemicals manufactured by Wako Pure Chemical Industries, Ltd.) were added. A 0.02 g/ml of sodium borohydride solution prepared by adding 1 g of sodium borohydride (manufactured by Wako Pure Chemical Industries, Ltd.) into 50 ml of ion-exchanged water was instilled into [this mixture], and a liquid containing silver particulates was obtained. After stirring for one hour, 200 ml of methanol (special grade chemicals manufactured by Wako Pure Chemical Industries, Ltd.) was added, and the silver particulates were agglomerated and precipitated. In addition, after the silver particulates were completely precipitated with centrifugal separation, toluene and methanol, which are supernatants, were removed and excess organic substances were removed, and approximately 6 g of the silver particulates were obtained. Using 5 g of the obtained silver particulates as a dispersion medium, 10 g of tetradecane (special grade chemicals manufactured by Wako Pure Chemical Industries, Ltd., log P value: 7.2) was added, and the conductive paste (silver colloidal dispersion liquid) 1 of the present invention was obtained by stirring the mixture.

[Evaluation Test]

(1) Dispersibility

The silver colloidal dispersion liquid 1 obtained as described above was set stationary in a container, and one day later at room temperature, dispersibility of the silver colloidal dispersion liquid 1 was evaluated by visually observing whether or not there was any precipitation and conditions of the supernatants. A case when any precipitation was hardly confirmed at the bottom of the container was evaluated as "○"; a case when a small amount precipitation was confirmed was evaluated as "Δ"; and a case when there was obviously a difference between upper side and a bottom side of the container and precipitation was clearly confirmed was evaluated as "×". Results are shown in Table 1.

(2) Reducibility

Dispersibility at the time of diluting the sliver colloidal dispersion liquid 1 obtained as described above 100-fold into a dispersion medium was visually evaluated. A case when [particles were] dispersed was evaluated as "○"; a case when agglomeration or silver mirror was partially observed was evaluated as "Δ"; and a case when agglomeration/precipitation was generated was evaluated as "×". Results are shown in Table 1.

(3) Viscosity Measurement

Viscosity of the silver colloidal dispersion liquid 1 obtained as mentioned above was measured using a cone-plate viscometer (rheometer manufactured by Anton Paar GmbH, MCR301). Measurement conditions were a measurement mode: shearing mode, shearing rate: 10 s$^{-1}$, cone plate (CP-50-2; 50 mm of diameter, angle: 2°, gap: 0.045 mm), and measurement temperature: 25° C. Results are shown in Table 1.

(4) Volume Resistivity

A coating was formed by applying the silver colloidal dispersion liquid 1 obtained as mentioned above onto a glass slide with a brush; the silver colloidal dispersion liquid 1 was sintered by heating/baking under conditions at 100° C. for one hour in a gear oven; and an conductive coating was formed. Volume resistivity of this coating was measured using a direct-current precision measuring instrument "(Portable) Precision Double Bridge 2769" manufactured by Yokogawa Meters & Instruments Corporation. Specifically, based upon a formula below, volume resistivity was converted from in-measuring terminal distance and thickness of an conductive coating. A case when the volume resistivity was 20 μΩ·cm or less was evaluated as "○" and another case when it exceeded 20 μΩ·cm was evaluated as "×". Results are shown in Table 1.

(Volume Resistivity ρν)=(resistance value $R$)×(coating width $w$)×(coating thickness $t$)/(in-terminal distance $L$)  Formula:

(5) Organic Component Measurement

Content of the organic component(s) contained in the silver colloidal dispersion liquid 1 obtained as mentioned above was measured using a thermogravimetric method. Specifically, solid content of the silver colloidal dispersion liquid 1 was heated at 10° C./min of rate of temperature increase, and the content of the organic component(s) was identified as a weight reduction at room temperature to 500° C. Results are shown in Table 1.

Example 2

DISPERBYK 140 (0.40 g), which is a polymer dispersant, and 2.0 g of hexylamine (special grade chemicals manufactured by Wako Pure Chemical Industries, Ltd.) were mixed, and [the mixture] was sufficiently stirred with a magnetic stirrer. While stirring, 6.0 g of silver nitrate was added into [this mixture], and [the mixture] was thickened. The obtained sticky substance was placed in a constant-temperature bath at 100° C., and it was reacted for approximately 15 minutes. In order to replace the dispersion medium of a suspension, after adding 10 ml of methanol and stirring, silver particulates were precipitated and separated by centrifugal separation, and 10 ml of methanol was added to the separated silver particulates again, and silver particulates were precipitated and separated by stirring and centrifugal separation. As a dispersion medium, 10 g of tetradecane (log P value: 7.2) was added into these silver particulates and stirred, and particle components having less dispersibility were removed by further centrifugal separation if necessary, and a silver colloidal dispersion liquid 2 was obtained. An evaluation test, which was similar to that in Example 1, was conducted, and results are shown in Table 1.

Example 2a

Furthermore, when a silver colloidal dispersion liquid was obtained similarly to Example 2 above except for adding 0.40 g of dodecylamine (first class grade chemicals manufactured by Wako Pure Chemical Industries, Ltd.), the yield was increased by 30%.

Example 3

Preparing similarly to Example 2a except for using SOLSPERSE 16000, which is a polymer dispersant, and dihydroterpinylacetate (manufactured by Nippon Terpene Chemicals, Inc., log P value: 3.4), which is a dispersion medium, a silver colloidal dispersion liquid 3 was obtained. The evaluation test similar to that in Example 1 was conducted, and results are shown in Table 1.

Example 4

Preparing similarly to Example 2a except for using SOLSPERSE 11200, which is a polymer dispersant, and dihydroterpioneol (manufactured by Nippon Terpene Chemicals, Inc., log P value: 2.7), which is a dispersion medium, a silver colloidal dispersion liquid 4 was obtained. The evaluation test similar to that in Example 1 was conducted, and results are shown in Table 1.

Example 5

Preparing with the similar method to that in Example 1 except for using butylamine, which is alkylamine with 6 or less of carbon number, SOLSPERSE 16000, which is a polymer dispersant, and isotridecanol (manufactured by Kyowa Hakko Chemical Co., Ltd., log P value: 5.4), which is a dispersion medium, a silver colloidal dispersion liquid 5 was obtained. The evaluation test similar to that in Example 1 was conducted, and results are shown in Table 1.

Comparative Example 1

Preparing similarly to Example 1 except for using oleic acid (manufactured by Wako Pure Chemical Industries, Ltd., first class grade chemicals) without using any polymer dispersant, a silver colloidal dispersion liquid 6 was obtained. The evaluation test similar to that in Example 1 was conducted, and results are shown in Table 1.

Comparative Example 2

Preparing similarly to Example 2a except for excluding hexylamine, a silver colloidal dispersion liquid 7 was obtained. The evaluation test similar to that in Example 1 was conducted, and results are shown in Table 1.

Comparative Example 3

Preparing similarly to Example 4 except for excluding SOLSPERSE 11200, which is a polymer dispersant, a silver colloidal dispersion liquid 8 was obtained. The evaluation test similar to that in Example 1 was conducted, and results are shown in Table 1.

Comparative Example 4

Preparing similarly to Example 3 except for replacing hexylamine with decylamine, a silver colloidal dispersion liquid 9 was obtained. The evaluation test similar to that in Example 1 was conducted, and results are shown in Table 1.

Comparative Example 5

Preparing similarly to Example 3 except for replacing hexylamine with octylamine, a silver colloidal dispersion liquid 10 was obtained. The evaluation test similar to that in Example 1 was conducted, and results are shown in Table 1.

TABLE 1

|  |  | Example 1 | Example 2 | Example 3 | Example 4 | Example 5 | Comparative example 1 | Comparative example 2 | Comparative example 3 | Comparative example 4 | Comparative example 5 |
|---|---|---|---|---|---|---|---|---|---|---|---|
| Alkylamine with 6 or less of carbon number |  | ○ | ○ | ○ | ○ | ○ | ○ | — | ○ | — | — |
| Polymer dispersant | SOLSPERSE 11200 | ○ | — | — | ○ | — | — | — | — | — | — |
|  | SOLSPERSE 16000 | — | — | ○ | — | ○ | — | — | — | ○ | ○ |
|  | DISPERBYK 140 | — | ○ | — | — | — | — | ○ | — | — | — |
| Solvent | Tetradecane | ○ | ○ | — | — | — | ○ | ○ | — | — | — |
| Solvent | Tetralin | — | — | — | ○ | — | — | — | ○ | — | — |
| LogP: 1.5 to 5.5 | Isotridecanol | — | — | — | — | ○ | — | — | — | — | — |
|  | Dihydroterpinylacetate | — | — | ○ | — | — | — | — | — | ○ | ○ |
| Silver colloidal dispersion liquid |  | 1 | 2 | 3 | 4 | 5 | 6 | 7 | 8 | 9 | 10 |
| Dispersibility |  | Δ | Δ | ○ | ○ | ○ | x | ○ | x | ○ | ○ |
| Reducibility |  | Δ | ○ | ○ | ○ | ○ | x | ○ | x | Δ | Δ |
| Viscosity at 25° C. (mPa·s) |  | 6 | 5 | 5 | 70 | 23 | 7 | 5 | 70 | 5 | 6 |
| Volume resistivity (μΩ·cm) |  | 10 ○ | 11 ○ | 9 ○ | 9 ○ | 10 ○ | 7 ○ | Not electrically conducted x | 5 ○ | Not electrically conducted x | 30 x |
| Weight reduction (%) | Room temperature to 200° C. | 5 | 3 | 5 | 4 | 4 | 5 | 0 | 4 | 1 | 3 |
|  | 200° C. to 500° C. | 5 | 4 | 5 | 5 | 4 | 1 | 9 (x) | 1 | 5 | 4 |
| Total |  | 10 ○ | 7 ○ | 10 ○ | 9 ○ | 8 ○ | 6 ○ | 9 ○ | 5 ○ | 6 ○ | 7 ○ |

As it is clear from the results shown in Table 1, as with the Examples, it is evident that compatibility between the low-temperature sinterability and the dispersion stability can be realized by adding appropriate amounts of alkylamine with 6 or less of carbon number and the polymer dispersant. If the dispersant is excessively adsorbed (to be determined according to a weight reduction percentage), the characteristics are impaired. In addition, it becomes ascertained that using a dispersion medium with 1.5 to 5.5 of log P value enables further improvement of the dispersion stability and obtainment of excellent reducibility.

Further, with metallic particulates that contain alkylamine with 6 or less of carbon number but does not contain a polymer dispersant, it becomes ascertained that the low-temperature sinterability can be obtained, but reducibility cannot be secured and the dispersion stability will not continue (Comparative examples 1 and 3). Further, with metallic particulates that do not contain alkylamine with 6 or less of carbon number but contain only a polymer dispersant, it becomes ascertained that the low-temperature sinterability cannot be obtained, but only securing of dispersibility and reducibility can be accomplished (Comparative example 2).

Furthermore, since the additive amounts of amine and the polymer dispersant are not amounts to be adsorbed to metallic particles, an amount that has been adsorbed to the metallic particles can be determined according to a weight reduction percentage, and the weight reduction percentage at room temperature to 200° C. can be approximated with an amount of adsorption of alkylamine with 6 or less of carbon number, and the weight reduction percentage at 200° C. to 500° C. can be approximated with an amount of adsorption of the polymer dispersant.

Experiment 2

Example 6

Toluene (first class grade chemicals manufactured by Wako Pure Chemical Industries, Ltd.) (200 ml) and 15 g of hexylamine (first class grade chemicals manufactured by Wako Pure Chemical Industries, Ltd.) were mixed and sufficiently stirred with a magnetic stirrer. While [the mixture] was stirred, 10 g of silver nitrate (special grade chemicals manufactured by Toyo Chemical Industrial Co., Ltd.) was added to [the mixture], and after the silver nitrate was dissolved, 10 g of SOLSPERSE 11200, which is a polymer dispersant, and 10 g of hexanoic acid (special grade chemicals manufactured by Wako Pure Chemical Industries, Ltd.) were added. A 0.02 g/ml of sodium borohydride solution prepared by adding 1 g of sodium borohydride (manufactured by Wako Pure Chemical Industries, Ltd.) into 50 ml of ion-exchanged water was instilled into [the mixture], and a liquid containing silver particulates was obtained. After stirring for one hour, 200 ml of methanol (special grade chemicals manufactured by Wako Pure Chemical Industries, Ltd.) was added and silver particulates were agglomerated and precipitated. In addition, after the silver particulates were completely precipitated by centrifugal separation, toluene and methanol, which are supernatants, were removed, and any excess organic substances were removed and approximately 6 g of silver particulates were obtained. As a dispersion medium, 0.18 g of dihydroterpinylacetate (manufactured by Nippon Terpene Chemicals, Inc., log P value: 3.4) was added to 1 g of the obtained silver particulates and [the mixture] was stirred and then, a silver colloidal dispersion liquid 11 was obtained.

[Evaluation Test]

(1) Measurement of Joint Strength

Using Die Bonder (manufactured by HISOL, Ltd.), a small amount of the silver colloidal dispersion liquid 11 obtained as mentioned above was applied onto an alumina plate (50 mm square) where its surface had been gold-plated, and a commercially-available blue LED chip (manufactured by GeneLite Inc., an area of base: 600 μm×600 μm) was laminated onto the alumina plate. On that occasion, the blue LED chip was not pressurized by applying external force. Then, the laminated body was placed into a circulating hot air oven adjusted at 200° C., and a baking treatment was applied under atmospherics for 120 minutes. After the laminated body was extracted from the circulating hot air oven and air-cooled down, a joint strength test was conducted at room temperature using Bonding Tester (manufactured by Rhesca Corporation). The joint strength upon peeling of the blue LED chips was divided by an area of base, and results are shown in Table 2. Furthermore, a unit of the joint strength is MPa.

(2) Measurement of Organic Content

The content of organic components contained the silver colloidal dispersion liquid 11 obtained as mentioned was measured with the thermogravimetric method. Specifically, the solid content of the silver colloidal dispersion liquid 11 was heated at 10° C./min of a rate of temperature increase, and the content of the organic components was identified as weight reduction at room temperature to 500° C. Results are shown in Table 2.

(3) Viscosity Measurement

Viscosity of the silver colloidal dispersion liquid 11 as mentioned above was measured using a cone-plate viscometer (Rheometer, MCR301 manufactured by Anton Paar GmbH). Measurement conditions were measurement mode: shearing mode, shearing rate: 10 $s^{-1}$, cone plate (CP-50-2: 50 mm of diameter, angle: 2°, gap: 0.045 mm), and measurement temperature: 25° C. Results are shown in Table 2.

Example 7

DISPERBYK 140 (0.20 g), 0.40 g of dodecylamine (first class grade chemicals manufactured by Wako Pure Chemical Industries, Ltd.), 6.0 g of hexylamine (first class grade chemicals manufactured by Wako Pure Chemical Industries, Ltd.) and 2.0 g of butylamine (first class grade chemicals manufactured by Wako Pure Chemical Industries, Ltd.) were mixed, and sufficiently stirred with a magnetic stirrer. While stirring, 6.0 g of silver nitrate (special grade chemicals manufactured by Toyo Chemical Industrial Co., Ltd.) was added into [this mixture] to thicken it. Next, the obtained sticky substance was placed in a constant-temperature bath at 100° C. and was reacted for approximately 15 minutes. In order to replace the dispersion medium in a suspension after reaction, 10 ml of methanol (first class grade chemicals manufactured by Wako Pure Chemical Industries, Ltd.) was added to the suspension and [the mixture] was stirred, silver particulates were precipitated and separated by centrifugal separation, and 10 ml of methanol (first class grade chemicals manufactured by Wako Pure Chemical Industries, Ltd.) was added into the separated silver particulates again and the silver particulates were precipitated and separated by stirring and centrifugal separation. As a dispersion medium, 0.8 g of dihydroterpinylacetate and 0.2 g of oleic acid were added into 6 g of the obtained silver particulates and [the mixture] was stirred, and a silver colloidal dispersion liquid 12 was obtained. The similar evaluation test was conducted as Example 6, and results were shown in Table 2.

Example 8

Preparing similarly to Example 7 except for using SOLSPERSE 16000 as a polymer dispersant, 0.8 g of isotridecanol and 0.2 g of ricinoleic acid as dispersion media, a silver colloidal dispersion liquid 13 was obtained. The similar evaluation test was conducted as Example 6, and results were shown in Table 2.

Comparative Example 6

Preparing similarly to Example 6 except for not using a polymer dispersant and using oleic acid as a dispersant, a silver colloidal dispersion liquid 14 was obtained. The similar evaluation test was conducted as Example 6, and results were shown in Table 2.

Comparative Example 7

Preparing similarly to Example 7 except not using a polymer dispersant and using oleic acid as a dispersant, a silver colloidal dispersion liquid 15 was obtained. The similar evaluation test was conducted as Example 6, and results were shown in Table 2.

Comparative Example 8

Preparing similarly to Example 7 except for not using hexylamine and butylamine, a silver colloidal dispersion liquid 18 was obtained. The similar evaluation test was conducted as Example 6, and results were shown in Table 2.

Comparative Example 9

Preparing similarly to Example 7 except for using butanol (log P: 0.9) as a dispersion medium, a silver colloidal dispersion liquid 16 was obtained. The similar evaluation test was conducted as Example 6, and results were shown in Table 2.

Comparative Example 10

Preparing similarly to Example 6 except for changing the additive amount of the dispersant to 0.5 g, a silver colloidal dispersion liquid 18 was obtained. The similar evaluation test was conducted as Example 6, and results were shown in Table 2.

Further, in the silver colloidal dispersion liquid containing a polymer dispersant, but not containing alkylamine with 6 or less of carbon number, superior dispersibility can be secured, but low-temperature sinterability is poor, and joint strength is extremely low (Comparative example 8).

Further, when the log P value for the dispersant is not within the range of 1.5 to 5.5 (Comparative example 9) and when an additive amount of the dispersant is excessive (Comparative example 10), sufficient joint strength is not obtained.

Experiment 3

Example 9

DISPERBYK 2155 (manufactured by BYK Japan KK) (0.40 g), which is a polymer dispersant, and 4.0 g of propylamine (special grade chemicals manufactured by Wako Pure Chemical Industries, Ltd.) were mixed, and [the mixture] was sufficiently stirred with a magnetic stirrer. While stirring, 6.0 g of silver nitrate was added into this [mixture] to thicken it. An obtained sticky substance (complex) was placed into a constant-temperature bath at 100° C., and was reacted for approximately 15 minutes. In order to replace the dispersant in the suspension liquid, after 10 ml of methanol was added and [the mixture] was stirred, silver particulates were precipitated and separated by centrifugal separation, and 10 ml of methanol was added again to the separated silver particulates, and the silver particulates were precipitated and separated by stirring and centrifugal separation. As a dispersant, 10 g of tetradecane (log P value 7.2) was added to the silver particulates and [the mixture] was stirred, and particle components having poor dispersibility

TABLE 2

| | Example 6 | Example 7 | Example 8 | Comparative example 6 | Comparative example 7 | Comparative example 8 | Comparative example 9 | Comparative example 10 |
|---|---|---|---|---|---|---|---|---|
| Alklamine with 6 or less carbon number | ○ | ○ | ○ | ○ | ○ | x | ○ | ○ |
| Polymer dispersant | ○ | ○ | ○ | x | x | ○ | ○ | ○ |
| Dispersion medium LogP 1.5 to 5.5 | ○ | ○ | ○ | ○ | ○ | ○ | x | ○ |
| Fatty acid | x | ○ | ○ | x | ○ | ○ | x | x |
| Colloidal dispersion liquid | 11 | 12 | 13 | 14 | 15 | 16 | 17 | 18 |
| Organic component on metallic particle (%) | 7 | 7 | 6 | 7 | 9 | 9 | 7 | 7 |
| Dispersion medium additive amount (%) | 15 | 15 | 10 | 15 | 15 | 15 | 15 | 30 |
| Viscosity at 25° C. (mPa · s) | 5000 | 5000 | 10000 | 4000 | 10000 | 10000 | 3000 | 2000 |
| Joint strength (MPs) | 20 | 29 | 33 | 9 | 18 | 6 | 5 | 15 |

As it becomes ascertained from the results shown in Table 2, the conductive paste (silver colloidal dispersion liquid) of the present invention is used, the joint strength shows a high value at 20 MPa to 33 MPa, and a joined body having superior strength even under low-temperature and pressureless bonding conditions (Examples 6 to 8). In particular, in the case of adding fatty acid to a dispersion medium, higher joint strength is indicated (Examples 7 and 8).

In the meantime, in the silver colloidal dispersion liquid (conductive paste) containing alkylamine with 6 or less of carbon number but not containing a polymer dispersant, the dispersion stability of colloid is not continued, and high strength is not obtained (Comparative example 6 and Comparative example 7).

were removed by further centrifugal separation as needed, and a silver colloidal dispersion liquid 19 was obtained.

[Evaluation Test]
(1) Dispersibility

The silver colloidal dispersion liquid 19 obtained as mentioned above was set stationary in a container, and one day later at room temperature, the dispersibility of the silver colloidal dispersion liquid 19 was evaluated by visually observing the existence or non-existence of precipitation and a state of a supernatant. A case when a precipitate was hardly confirmed in the container was evaluated as "○"; a case when a small amount of precipitate was confirmed was evaluated as "Δ"; and a case when there was clear difference in concentration between at top and bottom of the container, and a precipitate was clearly confirmed was evaluated as "×". Results are shown in Table 3.

(2) Reducibility

Dispersibility when the silver colloidal dispersion liquid 19 obtained as mentioned above was diluted into a dispersion medium 100-fold was visually evaluated. A case of being dispersed was evaluated as "○"; a case when agglomeration or silver mirror was partially observed was evaluated as "Δ"; and a case when agglomeration and precipitation were generated was evaluated as "×". Results are shown in Table 3.

(3) Viscosity Measurement

The viscosity of the silver colloidal dispersion liquid 19 obtained as mentioned above was measured using a cone-plate viscometer (Rheometer: MCR301 manufactured by Anton Paar GmbH). Measurement conditions were measurement mode: shearing mode, shearing rate: 10 s$^{-1}$, cone plate (CP-50-2: 50 mm of diameter, 2° of angle, 0.045 mm of gap), and measurement temperature: 25° C. Results are shown in Table 3.

(3) Volume Resistivity

The silver colloidal dispersion liquid 19 obtained as mentioned above was applied onto a glass slide with a brush to form a coating film, it was sintered by heating and baking at 100° C. for 1 hour in a gear oven, and an conductive coating was formed. Volume resistivity of this coating was measured using a current precision measuring instrument: "(Portable) Precision Double Bridge 2769" manufactured by Yokogawa Meters & Instruments Corporation. Specifically, the volume resistivity was converted from inter-measurement terminal distance and an conductive coating based upon the expression below. A case when the volume resistivity was 20 μΩ·cm or less was evaluated as "○" and a case when it exceeded 20 μΩ·cm was evaluated as "×". Results are shown in Table 3.

(volume resistivity $\rho v$)=(resistance value $R$)×(coating width $w$)×(coating thickness $t$)/(inter-terminal distance $L$)  Expression:

(4) Measurement of Organic Component

Content of the organic component contained in the silver colloidal dispersion liquid 19 obtained as mentioned above was measured using a thermogravimetric method. Specifically, the solid content of the silver colloidal dispersion liquid 19 was heated at 10° C./min of rate of temperature increase, and the content of the organic components was identified as a weight reduction from room temperature to 500° C. Results are shown in Table 3.

Example 10

SOLSPERSE 39000 (manufactured by The Lubrizol Corporation) (0.40 g), which is a polymer dispersant, and 2.0 g of hexylamine (special grade chemicals manufactured by Wako Pure Chemical Industries, Ltd.) were mixed, and [the mixture] was sufficiently stirred with a magnetic stirrer. While stirring, 6.0 g of silver nitrate was added to this [mixture] to thicken. An obtained sticky substance was placed into a constant-temperature bath at 100° C. and reacted for approximately 15 minutes. In order to replace the dispersion medium in the suspension liquid, after 10 ml of methanol was added and [the mixture] was stirred, silver particulates were precipitated and separated by centrifugal separation, and 10 ml of methanol was added again into the separated silver particulates, and the silver particulates were precipitated and separated by stirring and centrifugal separation. As a dispersion medium, 10 g of tetradecane (log P value 7.2) was added to the silver particulates and [the mixture] was stirred, and particle components having poor dispersibility were removed by further centrifugal separation as needed, and a silver colloidal dispersion liquid 20 was obtained. The evaluation test as similar to Example 9 was obtained, and results are shown in Table 3.

Example 10a

Furthermore, preparing similarly to Example 10 except for adding 0.40 g of dodecylamine (first class grade chemicals manufactured by Wako Pure Chemical Industries, Ltd.), a silver colloidal dispersion liquid was obtained, and the yield was increased by 30%.

Example 11

Preparing similarly to Example 10a except for using SOLSPERSE 16000 (manufactured by The Lubrizol Corporation), which is a polymer dispersant, a silver colloidal dispersion liquid 21 was obtained. The evaluation as similar to Example 9 was conducted, and results are shown in Table 3.

Example 12

Preparing similarly to Example 10a except for using isotridecanol (manufactured by Kyowa Hakko Chemical Co., Ltd., log P value 5.4) as a dispersion medium, a silver colloidal dispersion liquid 22 was obtained. The evaluation as similar to Example 9 was conducted, and results are shown in Table 3.

Example 13

Preparing with the similar method to that in Example 10a except for setting the blending quantity of hexylamine (special grade chemicals manufactured by Wako Pure Chemical Industries, Ltd.) to 4.0 g, a silver colloidal liquid 23 was obtained. The evaluation as similar to Example 9 was conducted, and results are shown in Table 3.

Example 14

SOLSPERSE 16000 (manufactured by The Lubrizol Corporation) (0.40 g), which is a polymer dispersant, and 2.0 g of hexylamine (special grade chemicals manufactured by Wako Pure Chemical Industries, Ltd.) were mixed, and [the mixture] was sufficiently stirred with a magnetic stirrer. While stirring, 6.0 g of silver nitrate was added to this [mixture] to thicken it. An obtained sticky substance was placed into a constant-temperature bath at 100° C. and reacted for approximately 15 minutes. In order to replace the dispersion medium in the suspension liquid, after 10 ml of methanol was added and [the mixture] was stirred, silver particulates were precipitated and separated by centrifugal separation, and 10 ml of methanol was added again into the separated silver particulates, and the silver particulates were precipitated and separated by stirring and centrifugal separation. As a dispersion medium, 10 g of dihydroterpinylacetate (manufactured by Nippon Terpene Chemicals, Inc., log P value 3.4) was added to the silver particulates and [the mixture] was stirred, and particle components having poor dispersibility were removed by further centrifugal separation as needed, and a silver colloidal dispersion liquid 24 was obtained. The evaluation as similar to Example 9 was conducted, and results are shown in Table 3.

Example 15

Preparing with the similar method to that in Example 14 except for using SOLSPERSE 17000 (manufactured by The Lubrizol Corporation), which is a polymer dispersant, a silver colloidal liquid 25 was obtained. The evaluation as similar to Example 9 was conducted, and results are shown in Table 3.

Comparative Example 11

Preparing similarly to Example 9 except for not using a polymer dispersant and using oleic acid (first class grade chemicals manufactured by Wako Pure Chemical Industries, Ltd.), a silver colloidal liquid 26 was obtained. The evaluation as similar to Example 9 was conducted, and results are shown in Table 3.

Comparative Example 12

Preparing similarly to Example 11 except for removing hexylamine, a silver colloidal liquid 27 was obtained. The evaluation as similar to Example 9 was conducted, and results are shown in Table 3.

Comparative Example 13

Preparing similarly to Example 12 except for using SOLSPERSE 39000, which is a polymer dispersant, a silver colloidal liquid 28 was obtained. The evaluation as similar to Example 9 was conducted, and results are shown in Table 3.

Comparative Example 14

Preparing similarly to Example 12 except for increasing an additive amount of SOLSPERSE 39000, which is a polymer dispersant, to three-fold, a silver colloidal liquid 29 was obtained. The evaluation as similar to Example 9 was conducted, and results are shown in Table 3.

Comparative Example 15

Preparing similarly to Example 11 except for replacing hexylamine with decylamine, a silver colloidal liquid 30 was obtained. The evaluation as similar to Example 9 was conducted, and results are shown in Table 3.

Comparative Example 16

Preparing as similarly to Example 11 except for replacing hexylamine with octylamine, a silver colloidal liquid 31 was obtained. The evaluation as similar to Example 9 was conducted, and results are shown in Table 3.

TABLE 3

| | | Example 9 | Example 10 | Example 11 | Example 12 | Example 13 | Example 14 | Example 15 | Comparative Example 11 | Comparative Example 12 | Comparative Example 13 | Comparative Example 14 | Comparative Example 15 | Comparative Example 16 |
|---|---|---|---|---|---|---|---|---|---|---|---|---|---|---|
| Alkylamine with 6 or less carbon number | | ○ | ○ | ○ | ○ | ○ | ○ | ○ | ○ | | ○ | ○ | | |
| Polymer dispersant | DISPERBYK 2155 | ○ | | | | | | | | | | | | |
| | SOLSPERSE 39000 | | ○ | | ○ | | | | | ○ | | ○ | | |
| | SOLSPERSE 16000 | | | ○ | | ○ | ○ | | | | | | ○ | ○ |
| | SOLSPERSE 17000 | | | | | | | ○ | | | | | | |
| Dispersion medium | Tetradecane (logP 7.2) | ○ | ○ | ○ | | | | | ○ | ○ | | | ○ | ○ |
| | Isotridecanol (logP 5.4) | | | | ○ | | | | | | ○ | ○ | | |
| | Dihydroterpinyl acetate (logP 3.4) | | | | | ○ | ○ | ○ | | | | | | |
| Silver colloidal dispersion liquid | | 19 | 20 | 21 | 22 | 23 | 24 | 25 | 26 | 27 | 28 | 29 | 30 | 31 |
| Dispersibility | | Δ | Δ | Δ | ○ | Δ | ○ | ○ | x | ○ | x | ○ | ○ | ○ |
| Reducibility | | Δ | ○ | ○ | ○ | Δ | ○ | ○ | x | ○ | x | ○ | Δ | Δ |
| Viscosity at 25° C. (mPa · s) | | 6 | 5 | 5 | 23 | 6 | 6 | 5 | 7 | 7 | 22 | 23 | 6 | 5 |
| Volume resistivity (μΩ · cm) | | 14 ○ | 10 ○ | 9 ○ | 9 ○ | 10 ○ | 9 ○ | 10 ○ | 7 ○ | Not conducted x | 5 ○ | Not conducted x | Not conducted x | 28 x |
| Weight reduction (%) | Room temp. to 200° C. | 9 | 3 | 4 | 4 | 8 | 4 | 4 | 5 | 1 | 5 | 4 | 2 | 4 |
| | 200° C. to 500° C. | 4 | 5 | 4 | 4 | 5 | 4 | 5 | 1 | 7 | 2 | 13 | 6 | 4 |
| | Total | 13 ○ | 8 ○ | 8 ○ | 8 ○ | 13 ○ | 8 ○ | 9 ○ | 6 ○ | 8 ○ | 7 ○ | 17 x | 8 ○ | 8 ○ |

As it is understood from the results shown in Table 3, as in the examples, it is understood that compatibility between the low-temperature sinterability and the dispersion stability can be realized by adding appropriate amounts of alkylamine with 6 or less of carbon number and a polymer dispersant. If the dispersant is excessively adsorbed (this will be determined from a weight reduction percentage), the characteristics will be impaired. In addition, it is understood that using a dispersion medium with 1.5 to 5.5 of log P value enables further improvement of the dispersion stability and obtainment of excellent reducibility.

Further, with metallic particulates containing alkylamine with 6 or less of carbon number but not containing a polymer dispersant, it is understood that low-temperature sinterability can be obtained, but reducibility cannot be secured and dispersion stability will not be continued (Comparative examples 13 and 15). Further, with metallic particulates not containing alkylamine with 6 or less of carbon number but containing only a polymer dispersant, it is understood that low-temperature sinterability cannot be obtained, but securing of dispersibility and reducibility will be accomplished (Comparative example 12).

Furthermore, since additive amounts of amine and a polymer dispersant are not amounts to be adsorbed to metallic particles, an amount adsorbed to the metallic particles can be determined from a weight reduction percentage, and the weight reduction percentage at room temperature to 200° C. can approximate the weight reduction percentage at 200° C. to 500° C. to an amount of adsorption of the polymer dispersant with an amount of adsorption of alkylamine with 6 or less of carbon number.

What is claimed is:

1. A conductive paste, comprising:
    inorganic particles having alkylamine with 6 or less of carbon number on at least a portion of a surface;
    a polymer dispersant that has a pigment affinity group in a main chain and/or a plurality of side chains, and, that comprises a polymer with a comb structure having a plurality of side chains constituting a solvation portion, a polymer having a plurality of pigment affinity portions made from a pigment affinity group in the main chain or a straight-chain polymer having a pigment affinity portion made from a pigment affinity group in one terminal of the main chain; and
    a dispersion medium, wherein
    a weight reduction percentage at the time of heating solid content of the conductive paste from room temperature to 500° C. by thermal analysis is 5% by weight or less, and the weight reduction percentage at the time of heating solid content of the conductive paste from 200° C. to 500° C. is 5% by weight or less, and the content of the alkylamine with 6 or less of carbon number in the conductive paste is 0.1% to 15% by weight.

2. The conductive paste according to claim 1, wherein the weight reduction percentage at the time of heating solid content of the conductive paste from room temperature to 200° C. by thermal analysis is 5% by weight or less, and, the weight reduction percentage at the time of heating solid content of the conductive paste from 200° C. to 500° C. is 5% by weight or less.

3. The conductive paste according to claim 1, wherein the content of the dispersion medium is 1% to 90% by weight.

4. The conductive paste according to claim 1, wherein the content of the dispersion medium is 1% to 20% by weight.

5. The conductive paste according to claim 1, wherein the alkylamine is at least one selected from the group consisting of butylamine, pentylamine and hexylamine.

6. The conductive paste according claim 1, wherein an octanol-water partition coefficient (log P value) of the dispersion medium is 1.5 to 5.5.

7. The conductive paste according to claim 1, wherein the dispersion medium is at least one selected from the group consisting of diethylene glycol dibutyl ether, isotridecanol, tetralin, cyclohexylbenzene, terpineol, dihydroterpioneol, dihydroterpinylacetate and p-cymene.

8. The conductive paste according to claim 1, wherein the dispersion medium comprises 0.5% to 10% by weight of fatty acid with a boiling point at 150° C. or higher.

9. The conductive paste according to claim 8, wherein the fatty acid is at least one selected from the group consisting of stearic acid, oleic acid, linoleic acid, linolenic acid and ricinoleic acid.

10. The conductive paste according to claim 1, wherein viscosity at 25° C. is 100 mPas·s to 1,000,000 mPas·s at 10 $s^{-1}$ of shearing rate.

11. The conductive paste according to claim 1, wherein viscosity at 25° C. is 1 mPas·s to 5,000 mPas·s at 10 $s^{-1}$ of shearing rate.

12. The conductive paste according to claim 1, wherein the inorganic particle is generated by thermolysis after a complex compound comprising the alkylamine and an inorganic compound comprising inorganic elements constituting the inorganic particle is generated.

* * * * *